United States Patent
Imamura

(10) Patent No.: US 10,571,282 B2
(45) Date of Patent: Feb. 25, 2020

(54) ELECTRONIC APPARATUS, POSITION SPECIFYING SYSTEM, POSITION SPECIFYING METHOD, AND STORAGE MEDIUM

(71) Applicant: CASIO COMPUTER CO., LTD., Shibuya-ku, Tokyo (JP)

(72) Inventor: Keiichi Imamura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/926,646

(22) Filed: Mar. 20, 2018

(65) Prior Publication Data

US 2018/0283881 A1 Oct. 4, 2018

(30) Foreign Application Priority Data

Mar. 28, 2017 (JP) ................. 2017-063844

(51) Int. Cl.
| | | |
|---|---|---|
| *G01C 21/28* | (2006.01) | |
| *H04W 4/02* | (2018.01) | |
| *G01C 21/20* | (2006.01) | |
| *G01C 21/00* | (2006.01) | |
| *G01S 19/24* | (2010.01) | |
| *G01S 19/42* | (2010.01) | |
| *H04W 64/00* | (2009.01) | |
| *G01C 21/36* | (2006.01) | |

(52) U.S. Cl.
CPC ........... *G01C 21/28* (2013.01); *G01C 21/005* (2013.01); *G01C 21/20* (2013.01); *G01S 19/24* (2013.01); *G01S 19/42* (2013.01); *H04W 4/027* (2013.01); *H04W 64/00* (2013.01); *G01C 21/3664* (2013.01)

(58) Field of Classification Search
CPC ...... G01C 21/165; G01C 21/28; G01C 21/03; G01C 21/005; G01C 21/20; G01S 19/42; H04W 64/00
USPC ...................................... 455/456.1
See application file for complete search history.

(56) References Cited

U.S. PATENT DOCUMENTS

| | | |
|---|---|---|
| 7,400,969 B2 | 7/2008 | Watanabe et al. |
| 7,561,961 B2 | 7/2009 | Wakamatsu et al. |
| 9,560,619 B2 | 1/2017 | Pijl |

(Continued)

FOREIGN PATENT DOCUMENTS

| | | |
|---|---|---|
| JP | 2001337156 A | 12/2001 |
| JP | 2006138835 A | 6/2006 |

(Continued)

OTHER PUBLICATIONS

Extended European Search Report (EESR) dated Aug. 22, 2018 issued in European Application No. 18163005.4.

(Continued)

*Primary Examiner* — Julio R Perez
(74) *Attorney, Agent, or Firm* — Holtz, Holtz & Volek PC

(57) ABSTRACT

An electronic apparatus includes a processor and a memory. The processor executes a program stored in the memory to perform operations including: acquiring position information of a user; specifying a movement state of the user; and determining appropriateness/inappropriateness of the acquired position information using a determination program according to the movement state.

12 Claims, 16 Drawing Sheets

(56) References Cited

U.S. PATENT DOCUMENTS

| | | | | |
|---|---|---|---|---|
| 2011/0172909 A1* | 7/2011 | Kahn | ................... | G01C 21/165 |
| | | | | 701/533 |
| 2015/0173037 A1 | 6/2015 | Pijl | | |
| 2017/0026801 A1* | 1/2017 | Ono | .......................... | G06F 3/14 |

FOREIGN PATENT DOCUMENTS

| | | | |
|---|---|---|---|
| JP | 2007155471 A | 6/2007 | |
| JP | 2014137803 A | 7/2014 | |
| JP | 2015527572 A | 9/2015 | |
| WO | 2014001947 A1 | 1/2014 | |
| WO | 2015178065 A1 | 11/2015 | |

OTHER PUBLICATIONS

Japanese Office Action dated Oct. 29, 2019 (and English translation thereof) issued in Japanese Patent Application No. 2017-063844.

\* cited by examiner

FIG. 3A

| ACTIVITY | CONVERTED SPEED VALUE Va[km/s] | TIME INTERVAL CRITERION Sa[s] |
|---|---|---|
| TREKKING | ○○[km/s] | △△[s] |
| FISHING | | |
| CYCLING | | |
| PADDLE | | |
| SURFING | | |
| SNOW | | |

FIG. 3B

| ACTIVITY | LOSS THRESHOLD Se[s] | LOSS EXTENSION RATIO X[%] |
|---|---|---|
| DAILY BEHAVIOR | □□[s] | ▲▲[%] |
| TREKKING | | |
| FISHING | | |
| CYCLING | | |
| PADDLE | | |
| SURFING | | |
| SNOW | | |

FIG. 3C

| ACTIVITY | RETURN RADIUS Rn[m] | CONVERTED SPEED VALUE Vd[km/h] | TIME INTERVAL CRITERION hd[h] |
|---|---|---|---|
| DAILY BEHAVIOR | xx[m] | ■■[km/h] | ●●[km/h] |
| TREKKING | | | |
| FISHING | | | |
| CYCLING | | | |
| PADDLE | | | |
| SNOW | | | | ns of the acquired position information using a determination program according to the movement state.

A position specifying method according to an aspect of the present invention is executed by an electronic apparatus including a processor. The position specifying method causes the processor to execute a program stored in a memory to perform operations comprising: acquiring position information of a user; specifying a movement state of the user; and determining appropriateness/inappropriateness of the acquired position information using a determination program according to the movement state.

A non-transitory computer-readable storage medium according to an aspect of the present invention stores a program that is executable by a computer that comprises a processor. The program is executable to cause the computer to perform operations including: acquiring position information of a user; specifying a movement state of the user; and determining appropriateness/inappropriateness of the acquired position information using a determination program according to the movement state.

ELECTRONIC APPARATUS, POSITION SPECIFYING SYSTEM, POSITION SPECIFYING METHOD, AND STORAGE MEDIUM

CROSS-REFERENCE TO RELATED APPLICATIONS

This application is based on and claims the benefit of priority from Japanese Patent Application No. 2017-063844, filed on Mar. 28, 2017, the content of which is incorporated herein by reference.

BACKGROUND OF THE INVENTION

Field of the Invention

The present invention relates to an electronic apparatus, a position specifying system, a position specifying method, and a storage medium.

Related Art

Conventionally, there is a technique of generating an error circle from position information and speed information of a user in the past when position information of the user is calculated. Such a technique, for example, is disclosed in JP 2006-138835 A.

In the technique disclosed in Patent Document 1, it is determined whether or not acquired position information is correct using a position and a speed at a time point before a time point at which position information is newly acquired. However, in accordance with the type of user's movement state, a criterion for the determination of appropriateness/inappropriateness of position information greatly changes, and thus, in a case in which the movement state of an actual user changes to be a movement state different from the position information and the speed information of the past, there is a concern that erroneous detection is determined. Thus, the accuracy of the determination of appropriateness/inappropriateness of position information is not necessarily high.

The present invention is in consideration of such situations, and an object thereof is to determine appropriateness/inappropriateness of the position information of a user with higher accuracy.

According to the present invention, the appropriateness/inappropriateness of position information of a user can be determined with higher accuracy.

SUMMARY OF THE INVENTION

An electronic apparatus according to an aspect of the present invention includes a processor and a memory, and the processor executes a program stored in the memory to perform operations including: acquiring position information of a user; specifying a movement state of the user; and determining appropriateness/inappropriateness of the acquired position information using a determination program according to the movement state.

A position specifying system according to an aspect of the present invention includes a first electronic apparatus that includes a processor and a memory and a second electronic apparatus that includes a processor and a memory. In at least one of the first electronic apparatus and the second electronic apparatus, the processor executes a program stored in the memory to perform operations including: acquiring position information of a user; specifying a movement state of the user; and determining appropriateness/inappropriate-

BRIEF DESCRIPTION OF THE DRAWINGS

FIG. 3A is a schematic diagram that illustrates parameters used in an acceleration filter.

FIG. 3B is a schematic diagram that illustrates parameters used in a loss extension filter.

FIG. 3C is a schematic diagram that illustrates parameters used in a positioning context filter.

DETAILED DESCRIPTION OF THE INVENTION

Embodiments of the present invention will be explained with reference to the drawings.

[Hardware Configuration]

Figure 1A:
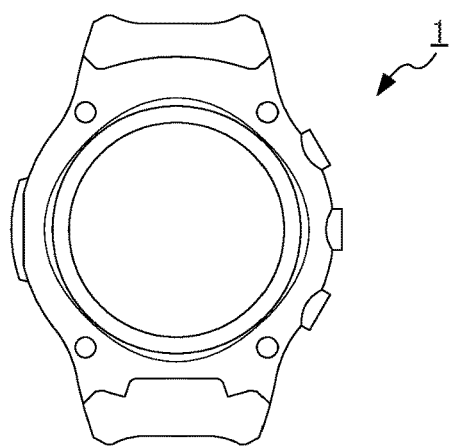
FIG. 1A is an external configuration diagram of a wrist terminal as a portable terminal according to one embodiment of the present invention.
Figure 1B:
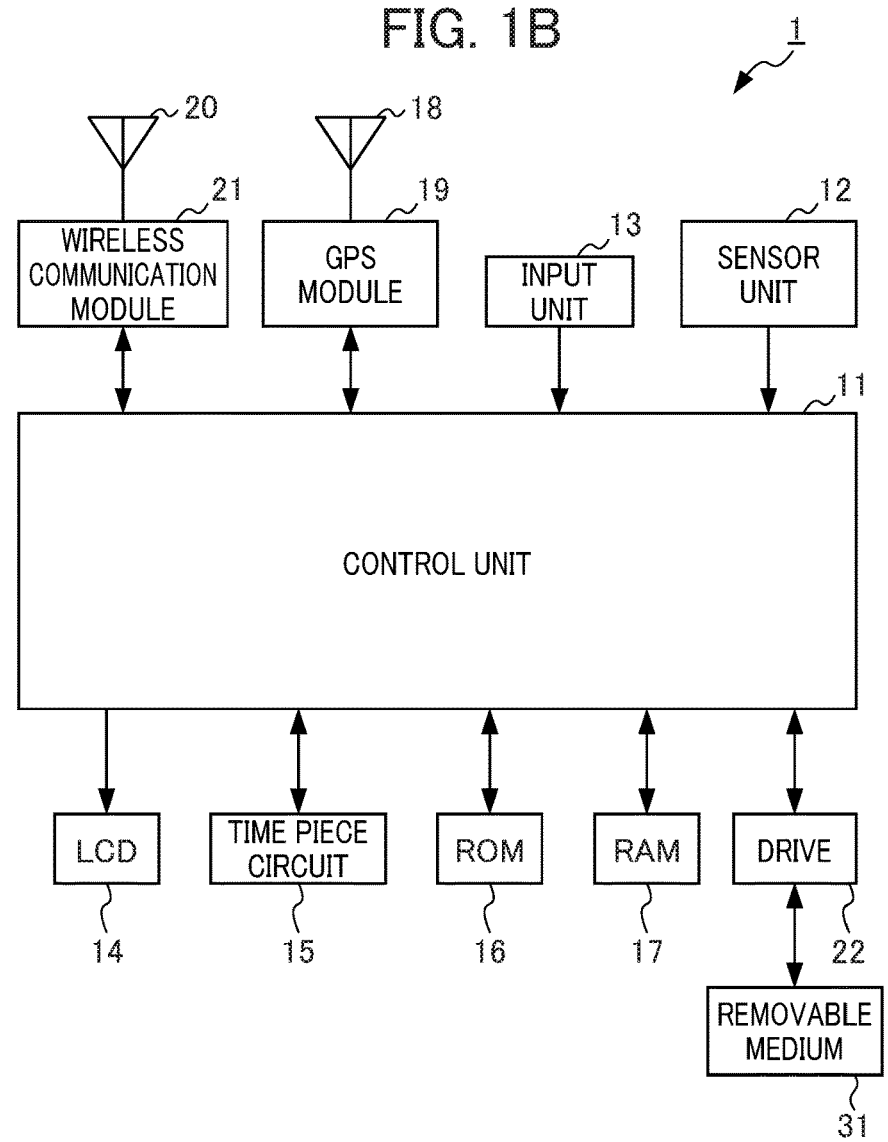
FIG. 1B is a block diagram that illustrates the hardware configuration of a wrist terminal as a portable terminal according to one embodiment of the present invention.

FIGS. 1A and 1B are diagrams illustrating the configuration of a wrist terminal 1 as an embodiment of an information terminal according to the present invention. FIG. 1A is a view illustrating an external appearance of the wrist terminal 1. FIG. 1B is a block diagram illustrating a hardware configuration of the wrist terminal 1. The wrist terminal 1 is an apparatus that is configured to be of wristwatch type and has functions similar to a smart phone. As illustrated in FIG. 1B, the wrist terminal 1 includes a control unit 11, a sensor unit 12, an input unit 13, an LCD (Liquid Crystal Display) 14, a timepiece circuit 15, ROM (Read Only Memory) 16, RAM (Read Access Memory) 17, a GPS antenna 18, a GPS module 19, a wireless communication antenna 20, a wireless communication module 21, and a drive 22. Where appropriate, the wrist terminal 1 can include different hardware such as an imaging unit.

The control unit 11 is configured with an arithmetic processing unit such as a CPU (Central Processing Unit) serving as a processor and controls the overall operation of the wrist terminal 1. For example, the control unit 11 executes various types of processing according to a program such as a program for position specifying process (described later) stored in the ROM 16. The sensor unit 12 includes various types of sensors such as an acceleration sensor, a gyroscope sensor, a barometer, a magnetic field sensor, or an altitude sensor. The acceleration sensor detects an acceleration in three axis directions of the wrist terminal 1, and outputs information indicating the detected acceleration to the control unit 11. The gyroscope sensor detects an angular velocity in three axis directions of the wrist terminal 1, and outputs information indicating the detected angular velocity to the control unit 11. The barometer detects the atmospheric pressure of environment where the wrist terminal 1 is present, and outputs information indicating the detected atmospheric pressure to the control unit 11. Based on the information output from the barometer, the wrist terminal 1 detects the altitude of the wrist terminal 1.

The input unit 13 is configured with various buttons or capacitive-type or resistance-film-type position input sensors laminated on a display area of the LCD 14, and inputs various types of information according to a user's operation for instruction. The LCD 14 outputs an image according to an instruction of the control unit 11. For example, the LCD 14 displays various images and screens of a user interface. In the present embodiment, a position input sensor of the input unit 13 is arranged so as to be superimposed on the LCD 14 to constitute a touch screen. The timepiece circuit 15 generates a time signal from signals generated by a system clock or oscillator to output the current time.

The ROM 16 stores information such as control programs executed by the control unit 11. The RAM 17 provides a work area used by the control unit 11 to execute various types of processing. The GPS antenna 18 receives radio waves sent from satellites for GPS, converts them into electrical signals, and outputs the electrical signals thus converted (hereinafter, referred to as "GPS signal") to the GPS module 19. The GPS module 19 detects the location (latitude, longitude, and altitude) of the wrist terminal 1 and the current time shown by the GPS based on the GPS signals input from the GPS antenna 18. The GPS module 19 outputs information showing the location thus detected and the current time to the control unit 11.

The wireless communication antenna 20 is an antenna that can receive radio waves of frequencies corresponding to wireless communication used by the wireless communication module 21 and is configured with a loop antenna and a rod antenna, for example. The wireless communication antenna 20 sends electrical signals of wireless communication inputted from the wireless communication module 21 as electromagnetic waves, converts the electromagnetic waves thus received into electrical signals, and outputs them to the wireless communication module 21. The wireless communication module 21 sends signals to another apparatus via the wireless communication antenna 20 in accordance with an instruction from the control unit 11. Furthermore, the wireless communication module 21 receives signals sent from another apparatus and outputs information indicated by the signals thus received to the control unit 11. A removable medium 31 composed of a magnetic disk, an optical disk, a magneto-optical disk, semiconductor memory or the like is loaded to the drive 22 as necessary. The removable medium 31 can store a variety of data such as the image data.

Figure 2:
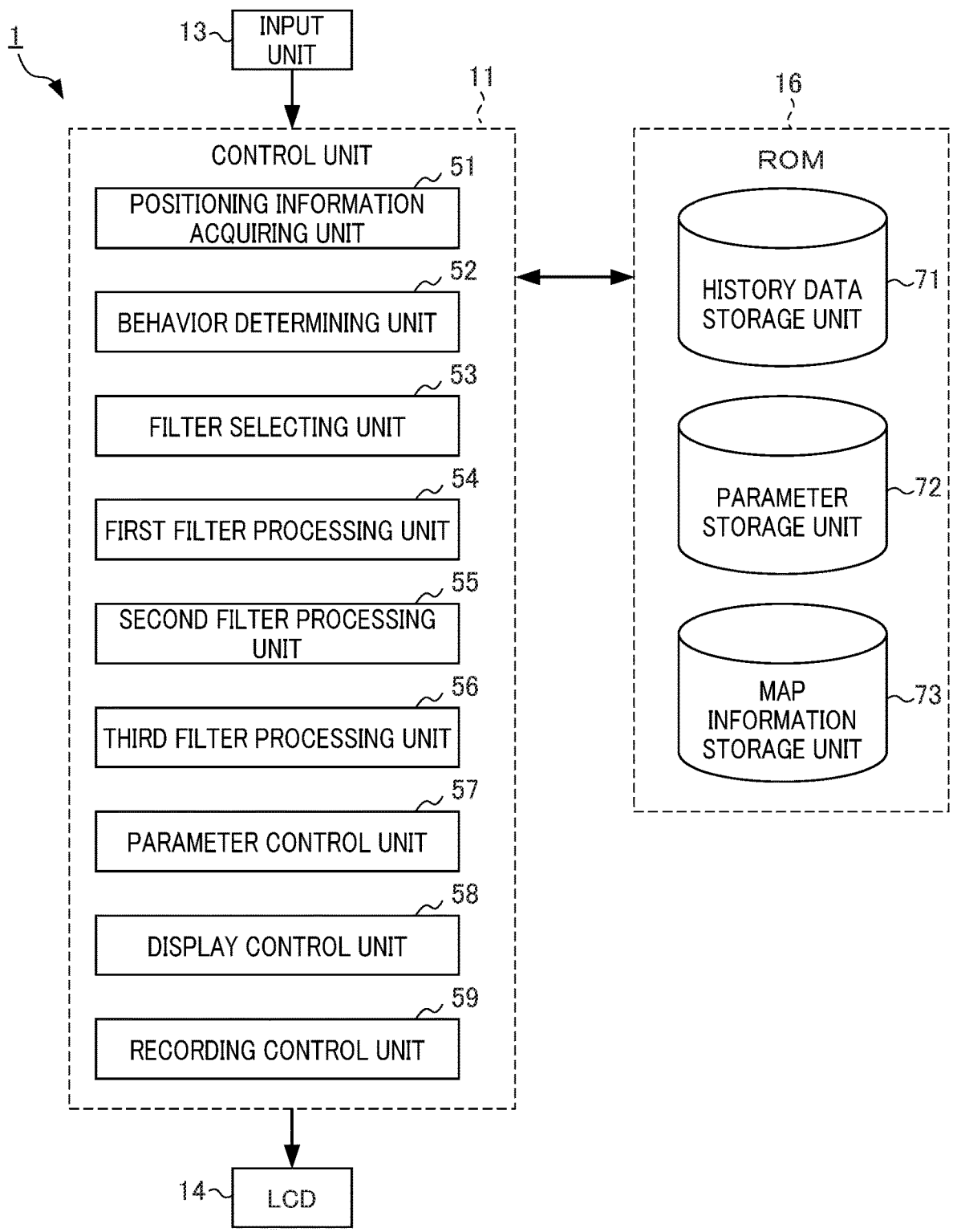
FIG. 2 is a functional block diagram that illustrates the functional configuration for performing a position specifying process and a parameter control process among functional configurations of the wrist terminal illustrated in FIG. 1B.

FIG. 2 is a functional block diagram that illustrates the functional configuration for performing a position specifying process and a parameter control process among functional configurations of the wrist terminal 1 illustrated in FIG. 1B. A position specifying process is a series of processes in which a position is specified by applying various filters (an acceleration filter, a loss extension filter, and a positioning context filter) to be described later to information of a position acquired by a GPS module (hereinafter, referred to as "positioning information" as is appropriate) to suppress use of inappropriate information. In addition, a parameter control process is a series of processes in which whether or not a position specified by performing a filter process with parameters set in a position specifying process is appropriate is verified as an ex post facto, and the parameters are updated with more appropriate values in accordance with a result of the verification. In a case in which the position specifying process and the parameter control process are performed, as illustrated in FIG. 2, in a control unit 11, a positioning information acquiring unit 51, a behavior determining unit 52, a filter selecting unit 53, a first filter processing unit 54, a second filter processing unit 55, a third filter processing unit 56, a parameter control unit 57, and a display control unit 58 function. In addition, in one area of a ROM 16, a history data storage unit 71, a parameter storage unit 72, and a map information storage unit 73 are set. In the history data storage unit 71, history data of positioning results is stored for each behavior of a user (for every behaviors corresponding to one day, one activity, or the like). In addition, as the history data, both unprocessed data that is data in which original information of a position acquired by the GPS module is stored and history data of positions specified from results of applying various filters to be described later are stored. The parameter storage unit 72 stores parameters used in various filters to be described later.

FIGS. 3A to 3C are schematic diagrams illustrating one example of parameters used in various filters. FIG. 3A is a diagram that illustrates parameters used in an acceleration filter, FIG. 3B is a diagram that illustrates parameters used in a loss extension filter, and FIG. 3C is a diagram that illustrates parameters used in a positioning context filter. In FIGS. 3A to 3C, set numerical values are represented with appropriate omission. As illustrated in FIG. 3A, in the acceleration filter, as types of activity, "trekking", "fishing", "cycling", "paddle" (paddling in a kayak or the like), "surfing", and "snow" (ski, snowboard, or the like) are defined, and, for these, a converted speed value Va [km/s] and a time interval criterion Sa [s] are set. The converted speed value Va represents a threshold of the degree of increase (acceleration) in the speed between two points a and b in a time series of the history data. The time interval criterion Sa is a threshold set using an experimental value or an experience value and, a value to be applied is set for each activity.

In addition, as illustrated in FIG. 3B, in the loss extension filter, as types of activity, "daily behavior", "trekking", "fishing", "cycling", "paddle" (paddling in a kayak or the like), "surfing", and "snow" (ski, snowboard, or the like) are defined, and, for these, a loss threshold Se and a loss extension ratio X [%] are set. The loss threshold Se is a threshold used for determining whether or not a loss extension filter is to be applied. The loss extension ratio X represents a ratio at which a loss period (time) is extended.

In addition, as illustrated in FIG. 3C, in the positioning context filter, as types of activity, "daily behavior", "trekking", "fishing", "cycling", "paddle" (paddling in a kayak or the like), and "snow" (ski, snowboard, or the like) are defined, and, for these, a return radius Rn [m], a converted speed value Vd [km/h], and a time interval criterion hd [h] are set as thresholds. The return radius Rn represents a threshold of a distance between a point a that is a time point before a point b of interest and a point c that is a time point after the point b in three points a, b, and c of history data in a time series. The converted speed value Vd represents a threshold of L/h1, wherein a time interval between the point a and the point b is h1, and a distance between the point b and the point a is L. The time interval criterion hd is a threshold set using an experimental value or an experience value and, here, a threshold Tth1 that is common to the activities is set. Referring back to FIG. 2, in the map information storage unit 73, map information used for displaying a position specified by a position specifying process in an overlapping manner is stored.

The positioning information acquiring unit 51 acquires information of a position (positioning information) acquired by the GPS module at a predetermined interval (for example, an interval of 0.1 seconds). Then, the positioning information acquiring unit 51 stores the acquired positioning information in the history data storage unit 71 as history data. The behavior determining unit 52 determines (selects) the type of behavior performed by a user using the wrist terminal 1. At this time, the behavior determining unit 52 can determine a behavior by determining the behavior from information (a type of activity that is directly designated or a type of activity that is indirectly perceived from an operation of a navigation system or the like) representing the type of behavior input by the user or analyzing the positioning information or a measurement result acquired by the sensor unit 12. In addition, the type of behavior may be determined by analyzing a user's behavior pattern using the behavior determining unit 52.

The filter selecting unit 53 selects a filter to be used among the acceleration filter, the loss extension filter, and the positioning context filter and parameters to be used in the used filter in accordance with the type of behavior determined by the behavior determining unit 52. In this embodiment, a filter to be used is set in advance in accordance with the type of behavior. Each filter, for example, is realized by a program executing a filter process and functions as a determination device determining appropriateness/inappropriateness of the positioning information.

Figure 4:
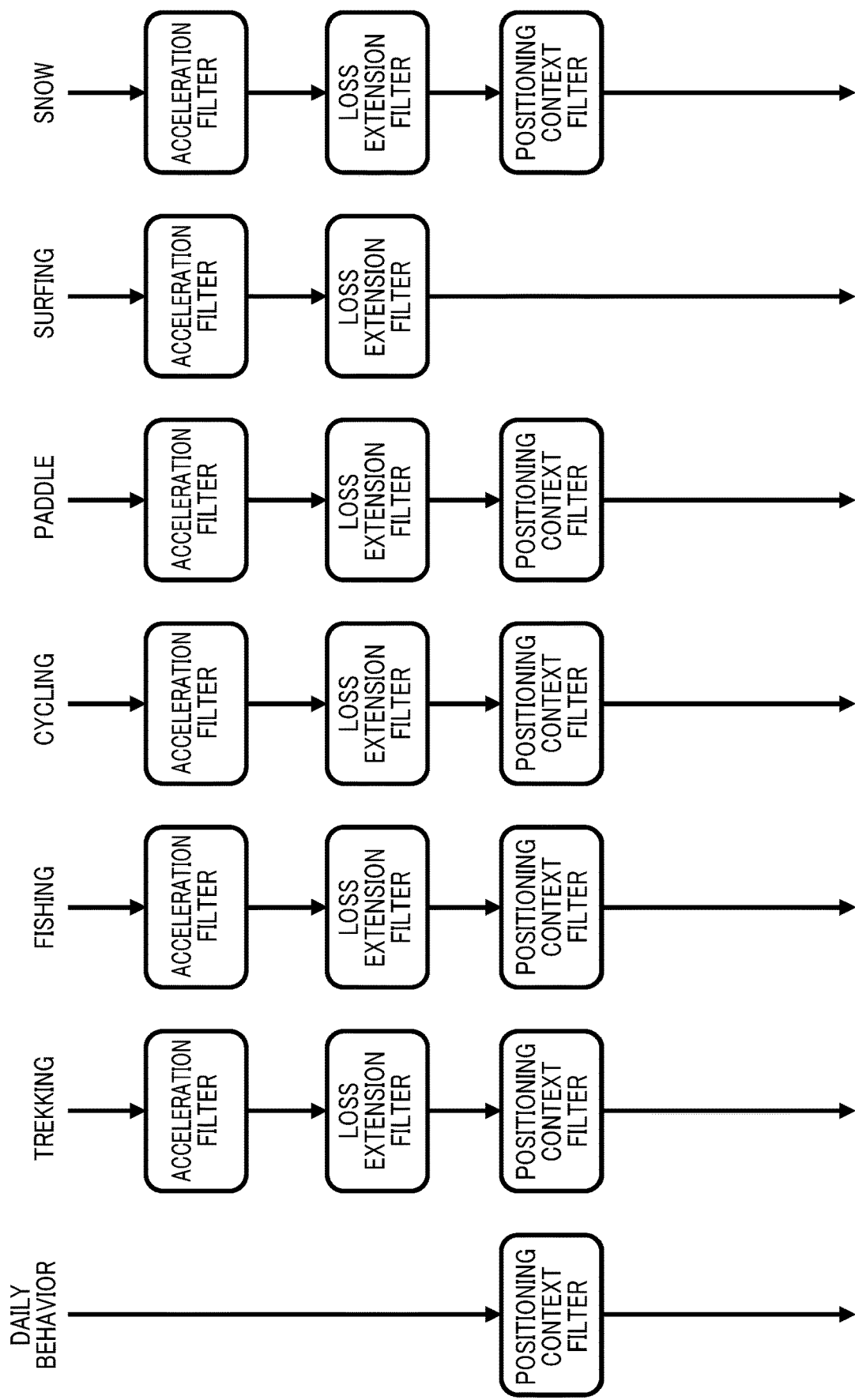
FIG. 4 is a schematic diagram that illustrates a relation between the type of behavior and a used filter.

FIG. 4 is a schematic diagram that illustrates a relation between the type of behavior and a used filter. As illustrated in FIG. 4, one of the acceleration filter, the loss extension filter, and the positioning context filter to be used for each type of behavior is set in advance. In this embodiment, the order of filters of an applied case is set to be the order of the acceleration filter, the loss extension filter, and the positioning context filter in accordance with the characteristics of the filters. As an example, in a case in which a user's behavior is determined to be cycling, the acceleration filter, the loss extension filter, and the positioning context filter are applied in the mentioned order.

In a case in which the acceleration filter is determined to be used by the filter selecting unit 53, the first filter processing unit 54 performs a filter process using the acceleration filter by using the parameters selected by the filter selecting unit 53. The acceleration filter is a filter that excludes positioning information exceeding an acceleration that is not possible in a real world as an abnormal value (determines the positioning information as an invalid value and excludes the value) on the basis of the acceleration acquired from the positioning information. In addition, the positioning information excluded by the acceleration filter is not handled as a loss of data, and data before and after the exclusion is handled as adjacent data.

Figure 5:
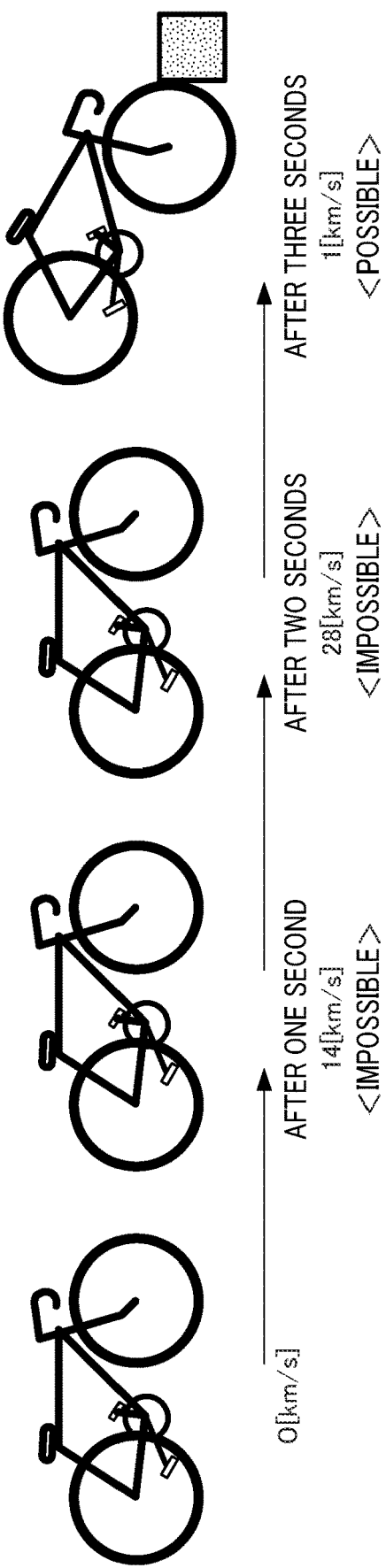
FIG. 5 is a diagram that schematically illustrates the characteristics of an acceleration filter.

FIG. 5 is a diagram that schematically illustrates the characteristics of the acceleration filter. As illustrated in FIG. 5, for example, in the case of riding a bicycle, in a case in which the acceleration in a traveling direction exceeds a human's acceleration limit (in an impossible case), the acceleration can be estimated as an abnormal value.

In the acceleration filter, when a GPS reception environment is good, positioning information that is an exclusion target is limited. Thus, the acceleration filter has an effect that is gentler than the other filters and is a filter mainly using past data and thus is a filter having high immediacy. For this reason, in this embodiment, the acceleration filter is set as an initial filter for positioning information. In a case in which the loss extension filter is determined to be used by the filter selecting unit 53, the second filter processing unit 55 performs a filter process using the loss extension filter by using the parameters selected by the filter selecting unit 53. The loss extension filter is a filter that, in a case in which a relatively long positioning loss period is generated, masks a positioning result for a predetermined time also after the end of the actual loss period (a positioning result after a predetermined loss period is determined as being an invalid value and is excluded), thereby suppressing a positioning disturbance occurring immediately after the loss period. In other words, the loss extension filter determines the appropriateness/inappropriateness of positioning information in accordance with the acquisition status (the length of the loss period) of the positioning information.

Figure 6:
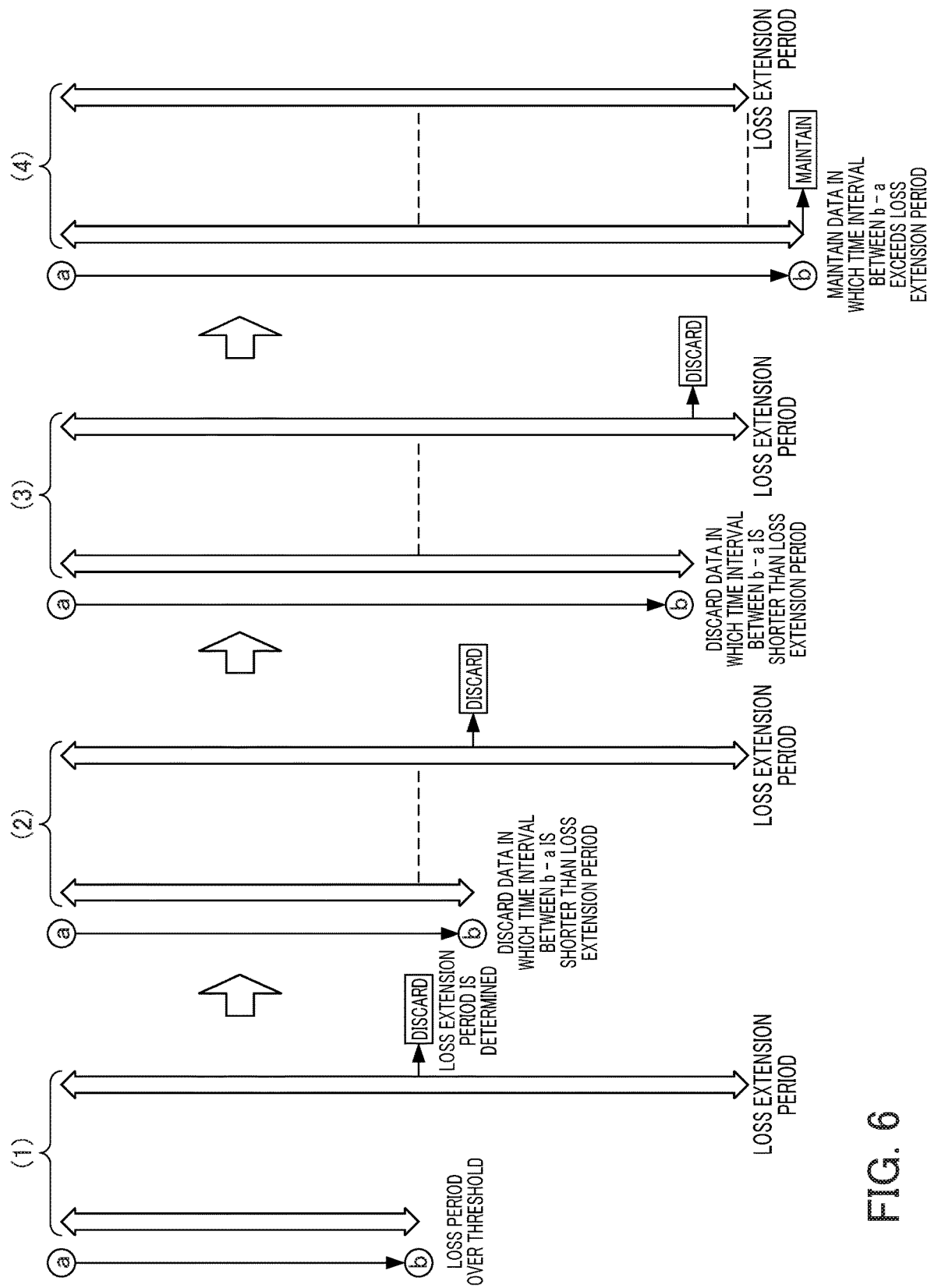
FIG. 6 is a diagram that schematically illustrates the characteristics of a loss extension filter.

FIG. 6 is a diagram that schematically illustrates the characteristics of the loss, extension filter. As illustrated in FIG. 6, in a case in which a loss period exceeding a threshold is generated in the GPS positioning information, a loss extension period acquired by extending the loss period at a predetermined ratio is set, and positioning information after the elapse of the loss extension period is maintained as history data after the filter process. In other words, in this embodiment, the loss extension period is set to be changed in accordance with the length of the loss period, and, as the loss period becomes longer, the loss extension period is set to be longer. According to this configuration, a problem in that, as the loss period becomes longer, a positioning error in position information acquired after the loss period increases, and it takes time to acquire correct position information can be solved. In addition, it may be configured such that a constant loss extension period is set regardless of the length of the loss period. By using a constant loss extension period, the amount of processing required for the determination of appropriateness/inappropriateness of the position information can be decreased. In addition, the loss extension filter can set positioning information that is not appropriate for display to be in a non-display state through simple calculation and thus is an effective filter for an electronic device performing a power-saving process performing positioning using only positioning information of a GPS without performing positioning according to self-contained navigation. Since the loss extension filter excludes positioning information over a relatively long period, there are cases in which it is not appropriate from the viewpoint of likelihood for the evaluation of positioning information to apply the acceleration filter to data after a filter process using the loss extension filter. For this reason, the loss extension filter is set as a filter of a stage later than that of the acceleration filter.

In a case in which the positioning context filter is determined to be used by the filter selecting unit 53, the third filter processing unit 56 performs a filter process using the positioning context filter by using the parameters selected by the filter selecting unit 53. The positioning context filter is a filter that excludes jumps of sudden positioning results occurring regardless of the situations on the basis of user's behavior tendency (determines jumps of sudden positioning results as invalid values and excludes such jumps).

Figure 7:
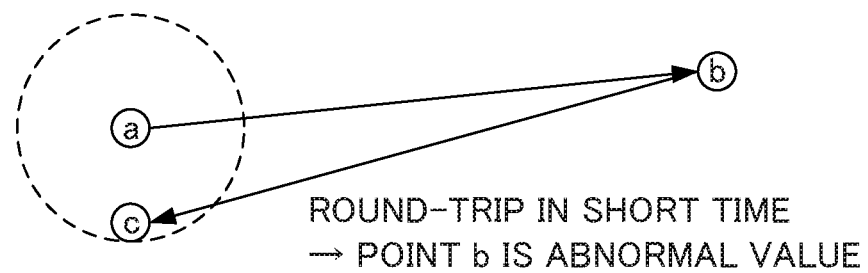
FIG. 7 is a diagram that schematically illustrates the characteristics of a positioning context filter.

FIG. 7 is a diagram that schematically illustrates the characteristics of the positioning context filter. As illustrated in FIG. 7, in a case in which a round-trip over a radius of action, which is set on the basis of user's behavior tendency, is performed in a short time, it cannot be a user's behavior and thus can be estimated as an abnormal value. In the example illustrated in FIG. 7, a user's radius of action is set using positioning information of points a and c that are time points before and after positioning information of a point b of interest in a time series, and it is determined whether or not the positioning information of the point b is an abnormal value with respect to the radius of action. By using the positioning information of the points a and c that are time points before and after the time point b in the time series for determining whether or not the positioning information of the point b is an abnormal value, compared to a case in which only the positioning information of a time point before the positioning information of interest, even in a case in which a behavior state and a moving speed greatly change before and after the point of interest, determination of an abnormal value can be performed with high accuracy. The process is not limited to the process described above, and it may be configured such that a user's radius of action is set by using only the positioning information of the point c that is a time point after the positioning information of the point b in the time series, and it is determined whether or not the positioning information of the point b is an abnormal value.

The positioning context filter can adaptively exclude various errors that cannot be eliminated by the acceleration filter and the loss extension filter and thus is set as a filter of a final stage.

By performing a parameter control process, the parameter control unit 57 detects an error from an actual position in a result of specifying a position through a position specifying process and feeds the error backs to the values of the parameters used in each filter. Accordingly, machine learning of the parameters used in the position specifying process is performed, and the parameters having high accuracy can be achieved. For example, the parameter control unit 57, for training data of which the actual position is separately perceived, specifies a position through the position specifying process from positioning information acquired by the positioning information acquiring unit and adjusts the parameters of the filter such that a difference between the specified position and a position of a correct answer is decreased. Other than a case in which training data of which the actual position is separately perceived is used, in a case in which a position having a predetermined level of validity is estimated through map matching (route fitting) or the like, the parameters of the filter may be adjusted such that a difference between the estimation result and a position specified by the position specifying process is decreased.

The parameter control process is performed as an ex post facto process for the position specifying process at a timing (for example, midnight) at which the operating rate of the control unit 11 of the wrist terminal 1 is low. Here, when the position specifying process is performed, by performing the parameter control process in parallel therewith, the parameter control unit 57 may sequentially update the parameters. The display control unit 58 displays a map screen on which a position representing a moving history is displayed to be superimposed on map information on an LCD 14 on the basis of the history data after the filter process that is stored in the history data storage unit 71. The recording control unit 59 stores process results of the first filter processing unit 54, the second filter processing unit 55, and the third filter processing unit 56 in the history data storage unit 71. In addition, the recording control unit 59 stores a result of the filter process in the history data storage unit 71 in association with unprocessed data with the unprocessed data, in which sensor information acquired by the sensor unit 12 or the information of a position acquired by the GPS module is stored in its original state, maintained.

[Operation]

Next, the operation of the wrist terminal I will be described.

[Positioning Process]

Figure 8:
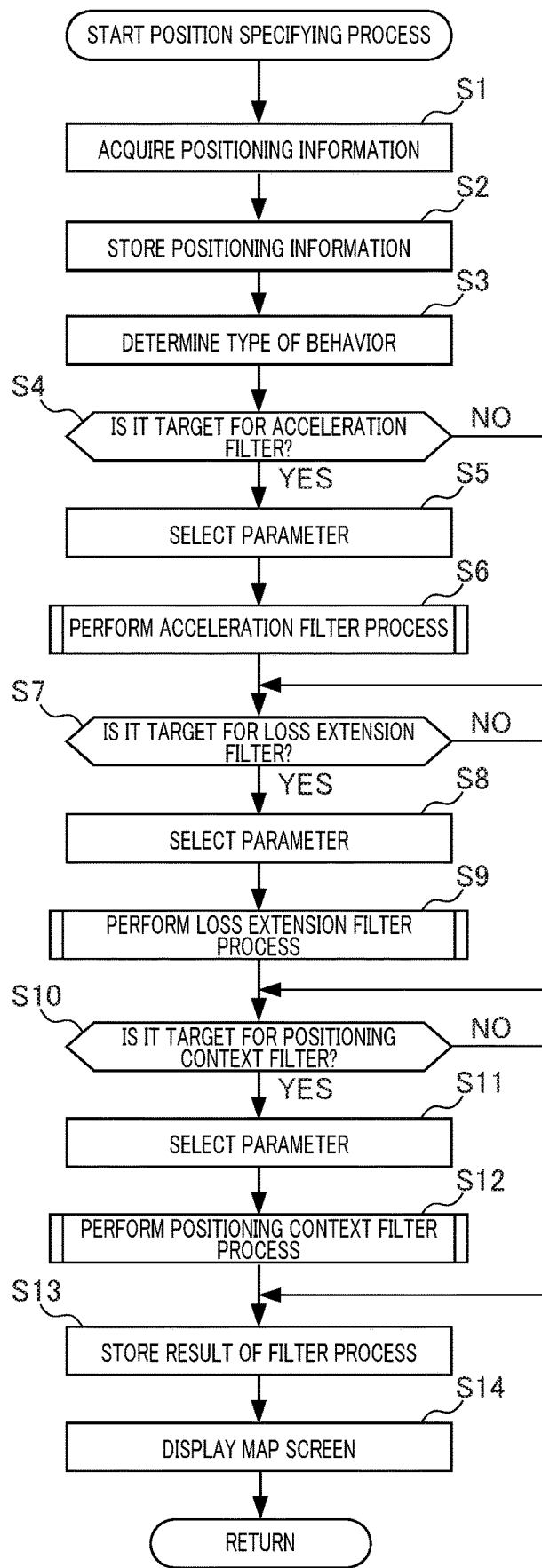
FIG. 8 is a flowchart that describes the flow of a position specifying process performed by the wrist terminal illustrated in FIG. 1B having the functional configuration illustrated in FIG. 2.

FIG. 8 is a flowchart that describes the flow of a position specifying process performed by the wrist terminal 1 illustrated in FIG. 1B having the functional configuration illustrated in FIG. 2. The position specifying process is started by a user's direction for starting the position specifying process.

In step S1, information of a position acquired by the GPS module (positioning information) is acquired at a predetermined interval (for example, at the interval of 0.1 seconds). In step S2, the positioning information acquiring unit 51 stores the acquired positioning information in the history data storage unit 71 as history data. In step S3, the behavior determining unit 52 determines the type of behavior performed by the user using the wrist terminal 1.

In step S4, the filter selecting unit 53 determines whether or not the type of behavior determined by the behavior determining unit 52 is a target behavior for using the acceleration filter. In a case in which the type of behavior determined by the behavior determining unit 52 is a target behavior for using the acceleration filter, "Yes" is determined in step S4, and the process proceeds to step S5. On the other hand, in a case in which the type of behavior determined by the behavior determining unit 52 is not a target behavior for using the acceleration filter, "No" is determined in step S4, and the process proceeds to step S7.

In step S5, the filter selecting unit 53 selects parameters to be used by the acceleration filter on the basis of the type of behavior determined by the behavior determining unit 52. In step S6, the first filter processing unit 54 performs a filter process (acceleration filter process) using the acceleration filter by using the parameters selected by the filter selecting unit 53.

In step S7, the filter selecting unit 53 determines whether or not the type of behavior determined by the behavior determining unit 52 is a target behavior for using the loss extension filter. In a case in which the type of behavior determined by the behavior determining unit 52 is a target behavior for using the loss extension filter, "Yes" is determined in step S7, and the process proceeds to step S8. On the other hand, in a case in which the type of behavior determined by the behavior determining unit 52 is not a target behavior for using the loss extension filter, "No" is determined in step S7, and the process proceeds to step S10.

In step S8, the filter selecting unit 53 selects parameters to be used by the loss extension filter on the basis of the type of behavior determined by the behavior determining unit 52. In step S9, the second filter processing unit 55 performs a filter process (loss extension filter process) using the loss extension filter by using the parameters selected by the filter selecting unit 53.

In step S10, the filter selecting unit 53 determines whether or not the type of behavior determined by the behavior determining unit 52 is a target behavior for using the positioning context filter. In a case in which the type of behavior determined by the behavior determining unit 52 is a target behavior for using the positioning context filter, "Yes" is determined in step S10, and the process proceeds to step S1. On the other hand, in a case in which the type of behavior determined by the behavior determining unit 52 is not a target behavior for using the positioning context filter, "No" is determined in step S10, and the process proceeds to step S13.

In step S1, the filter selecting unit 53 selects parameters to be used by the positioning context filter on the basis of the type of behavior determined by the behavior determining unit 52. In step S12, the third filter processing unit 56 performs a filter process (positioning context filter process) using the positioning context filter by using the parameters selected by the filter selecting unit 53. In step S13, the recording control unit 59 stores a result of the filter process in the history data storage unit 71.

In step S14, the display control unit 58 displays a map screen, in which a position representing a moving history is displayed to be superimposed on map information, on the LCD 14 on the basis of the history data after the filter process that is stored in the history data storage unit 71. After step S14, until an operation directing the end of the position specifying process is performed by the user, the position specifying process is repeated.

[Acceleration Filter Process]

Figure 9:
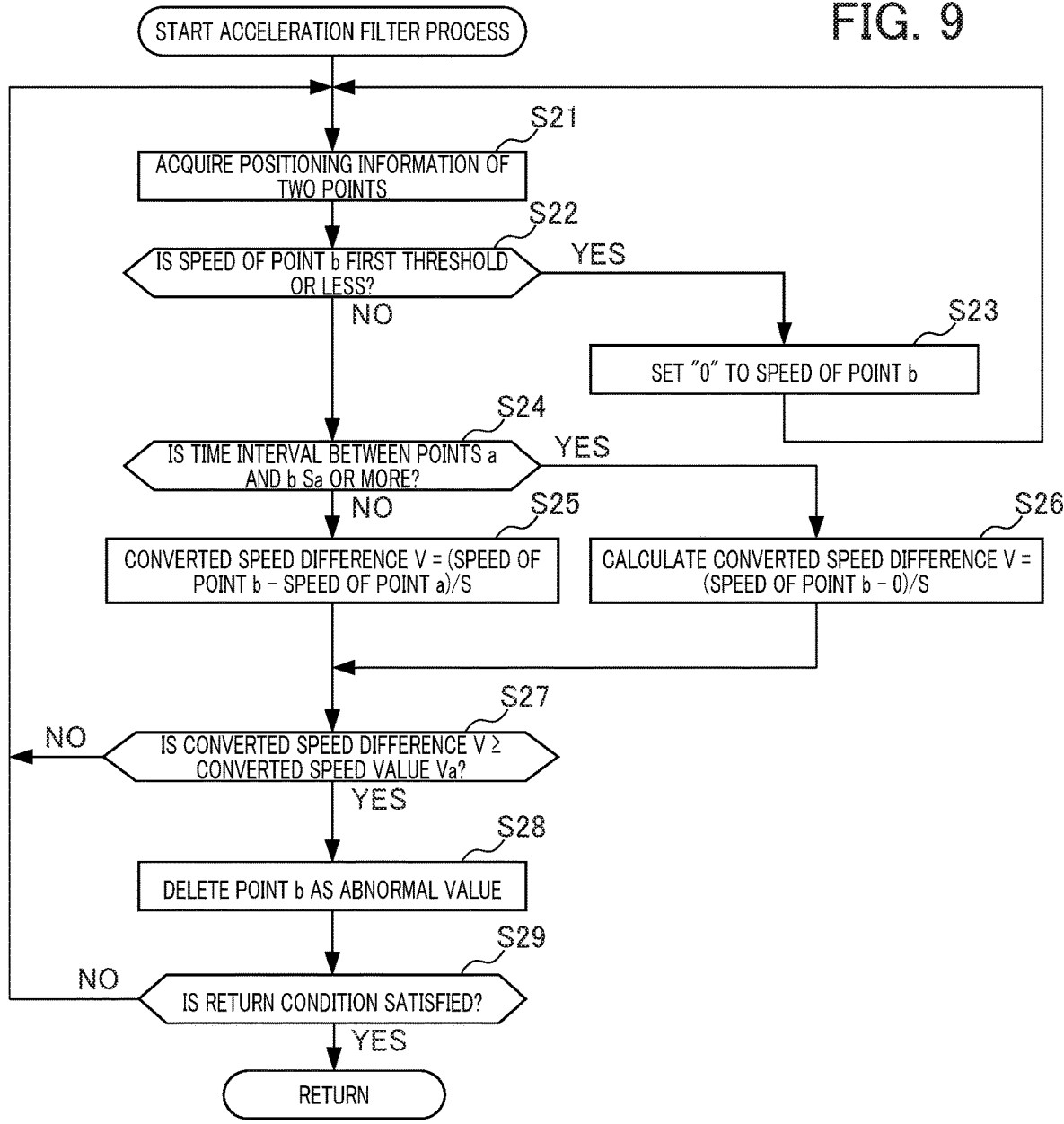
FIG. 9 is a flowchart that describes the flow of an acceleration filter process.

Next, the acceleration filter process performed in step S6 of the position specifying process will be described FIG. 9 is a flowchart that describes the flow of the acceleration filter process. In step S21, the first filter processing unit 54 acquires positioning information of two points a and b in a time series that are processing targets.

In step S22, the first filter processing unit 54 determines whether or not the speed of the point b is a first threshold or less. The first threshold is a value of low speed (for example, 2 km/h) for which the speed at the point b can be estimated to be substantially zero. In a case in which the speed of the point b is the first threshold or less, "Yes" is determined in step S22, and the process proceeds to step S23. On the other hand, in a case in which the speed of the point b is not the first threshold or less, "No" is determined in step S22, and the process proceeds to step S24.

In step S23, the first filter processing unit 54 sets the speed of the point b to zero. After step S23, the positioning information chat is the processing target is transitioned to the next two points, and the process proceeds to step S21. In step S24, the first filter processing unit 54 determines whether or not a time interval between the points a and b is the time interval criterion Sa or more. In a case in which the time interval between the points a and b is not the time interval criterion Sa or more, "No" is determined in step S24, and the process proceeds to step S25. On the other hand, in a case in which the time interval between the points a and b is the time interval criterion Sa or more, "Yes" is determined in step S24, and the process proceeds to step S26.

In step S25, the first filter processing unit 54 calculates a converted speed difference V as the converted speed difference V=(the speed of the point b−the speed of the point a)/S. In step S26, the first filter processing unit 54 calculates the converted speed difference V as the converted speed difference V=(the speed of the point b−0)/S. In other words, in step S26, in a case in which a positioning loss is continued for a long time, the degree of increase in the speed (acceleration) of the point b is evaluated through a comparison with zero.

In step S27, the first filter processing unit 54 determines whether or not the converted speed difference V is a converted speed value Va or more. The process of step S27 corresponds to determination of whether or not the positioning information of the point b is an invalid value from the viewpoint of the acceleration. In a case in which the converted speed difference V is not the converted speed value Va or more, "No" is determined in step S27, and the process proceeds to step S21. On the other hand, in a case in which the converted speed difference V is the converted speed value Va or more, "Yes" is determined in step S27, and the process proceeds to step S28.

In step S28, the first filter processing unit 54 deletes the point b from the history data as an abnormal value. In step S29, the first filter processing unit 54 determines whether or not a condition for returning to the position specifying process is satisfied. The condition for returning to the position specifying process, for example, in a case in which the history data stored in the history data storage unit 71 is processed as an ex post facto, is being final data of the processing target (being at the end of data in units of activity, corresponding to one day, or the like) and, in a case in which positioning information is processed in real time, when each block of data temporarily stored in a buffer having a predetermined size is processed, being final data of the processing target (being at the end of a block of data stored in the buffer), or the like. In addition, in a case in which the positioning information is processed in real time and in a case in which data is not stored in a buffer (the process is performed every time when positioning information is input), in step S29, the condition for returning to the position specifying process is determined to be satisfied. In a case in which the condition for returning to the position specifying process is not satisfied, "No" is determined in step S29, and the positioning information of the processing target is transitioned to the next two points, and the process proceeds to step S21. On the other hand, in a case in which the condition for returning to the position specifying process is satisfied, "Yes" is determined in step S29, and the process is returned to the position specifying process.

[Loss Extension Filter Process]

Figure 10:
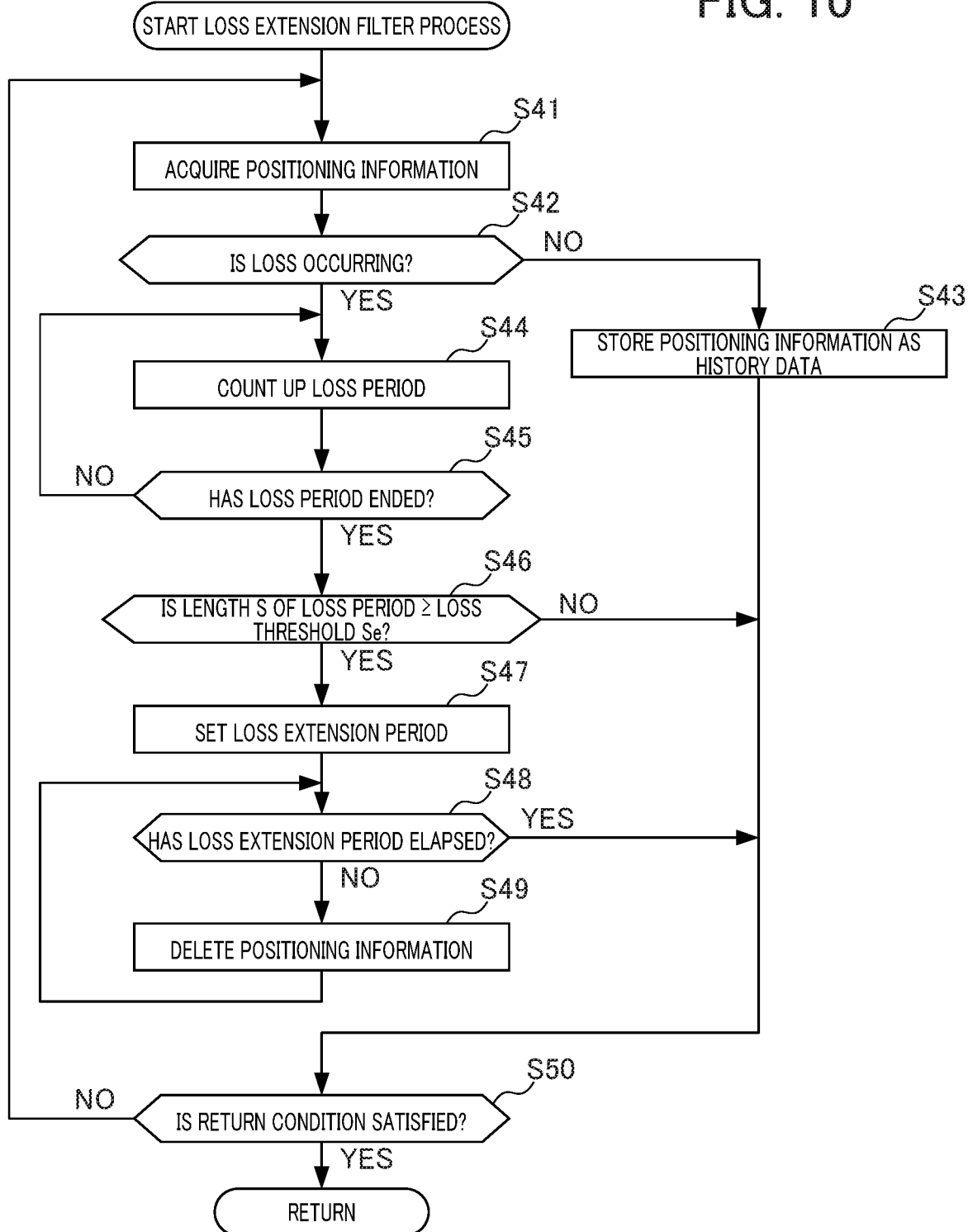
FIG. 10 is a flowchart that illustrates the flow of a loss extension filter process.

Next, the loss extension filter process performed in step S9 of the position specifying process will be described FIG. 10 is a flowchart that illustrates the flow of the loss extension filter process. In step S41, the second filter processing unit 55 acquires one piece of positioning information. Here, the positioning information is acquired at a predetermined interval (for example, at the interval of 0.1 seconds or the like) and, in step S41, a process of sequentially acquiring positioning information to be acquired at the predetermined interval for each one loop is performed.

In step S42, the second filter processing unit 55 determines whether or not a loss occurs in the acquisition of the positioning information in a case in which a loss does not occur in the acquisition of the positioning information, "No" is determined in step S42, and the process proceeds to step S43. On the other hand, in a case in which a loss occurs in the acquisition of the positioning information, "Yes" is determined in step S42, and the process proceeds to step S44.

In step S43, the second filter processing unit 55 stores the acquired positioning information as history data, and the process proceeds to step S50. In step S44, the second filter processing unit 55 counts up a loss period of the positioning information.

In step S45, the second filter processing unit 55 determines whether or not the loss period has ended. In a case in which the loss period has not ended, "No" is determined in step S45, and the process proceeds to step S44. On the other hand, in a case in which the loss period has ended, "Yes" is determined in step S45, and the process proceeds to step S46.

In step S46, the second filter processing unit 55 determines whether or not the length S of the loss period is a loss threshold. Se or more. The process of step S46 corresponds to determination of a positioning result after a constant loss period as being an invalid value. In a case in which the length S of the loss period is not the loss threshold Se or more, "No" is determined in step S46, and the process proceeds to step S50. On the other hand, in a case in which the length S of the loss period is the loss threshold Se or more, "Yes" is determined in step S46, and the process proceeds to step S47. In step S47, the second filter processing unit 55 sets a loss extension period (=loss period×loss extension rate X).

In step S48, the second filter processing unit 55 determines whether or not the loss extension period has elapsed. In a case in which the loss extension period has not elapsed, "No" is determined in step S48, and the process proceeds to step S49. On the other hand, in a case in which the loss extension period has elapsed, "Yes" is determined in step S48, and the process proceeds to step S50.

In step S49, the second filter processing unit 55 deletes the positioning information acquired in the loss extension period from the history data, transitions the positioning information of the processing target to a next point, and the process is returned to step S48. In step S50, the second filter processing unit 55 determines whether or not the condition for returning to the position specifying process is satisfied. The condition for returning to the position specifying process, for example, in a case in which the history data stored in the history data storage unit 71 is processed as an ex post facto, is being final data of the processing target (being at the end of data in units of activity, corresponding to one day, or the like) and, in a case in which positioning information is processed, in real time, when each block of data temporarily stored in a buffer having a predetermined size is processed, being final data of the processing target (being at the end of a block of data stored in the buffer), or the like. In addition, in a case in which the positioning information is processed in real time and in a case in which data is not stored in a buffer (the process is performed every time when positioning information is input), in step S50, the condition for returning to the position specifying process is determined to be satisfied. In a case in which the condition for returning to the position specifying process is not satisfied, "No" is determined in step S50, and the positioning information of the processing target is transitioned to the next point, and the process proceeds to step S41. On the other hand, in a case in which the condition for returning to the position specifying process is satisfied, "Yes" is determined in step S50, and the process is returned to the position specifying process.

[Positioning Context Filter Process]

Figure 11:
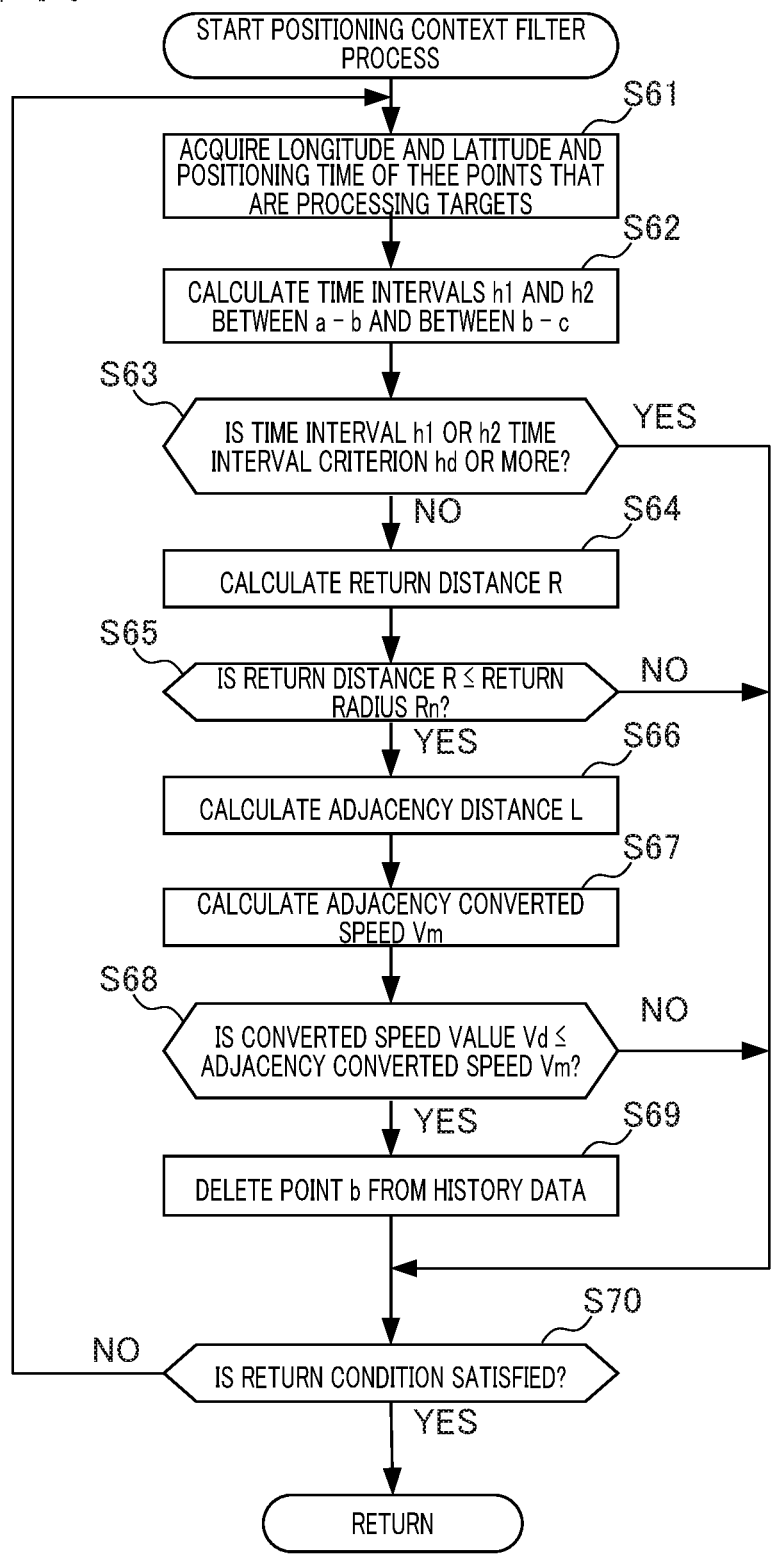
FIG. 11 is a flowchart that describes the flow of a positioning context filter process.

Next, the positioning context filter process performed in step S12 of the position specifying process will be described FIG. 11 is a flowchart that describes the flow of the positioning context filter process. In step S61, the third filter processing unit 56 acquires longitude and latitude and positioning time of each of three points a, b, and c in a time series that are processing targets. In step S62, the third filter processing unit 56 calculates a time interval h1 between the points a and b and a time interval h2 between the points b and c.

In step S63, the third filter processing unit 56 determines whether the time interval h1 between the points a and b is the time interval criterion hd or more or whether the time interval h2 between the points b and c is the time interval criterion hd or more. In step S63, in a case in which the time interval h1 between the points a and b is the time interval criterion hd or more, or the time interval h2 between the points b and c is the time interval criterion hd or more, "Yes" is determined in step S63, and the process proceeds to step S70. On the other hand, in step S63, in a case in which the time interval h1 between the points a and b is not the time interval criterion hd or more, and the time interval h2 between the points b and c is not the time interval criterion hd or more, "No" is determined in step S63, and the process proceeds to step S64.

In step S64, the third filter processing unit 56 calculates a return distance R (a distance between the points a and c acquired from the longitude and latitude). In step S65, the third filter processing unit 56 determines whether or not the return distance R is the return radius Rn or less. In a case in which the return distance R is not the return radius Rn or less, "No" is determined in step S65, and the process proceeds to step S70. On the other hand, in a case in which the return distance R is the return radius Rn or less, "Yes" is determined in step S65, and the process proceeds to step S66.

In step S66, the third filter processing unit 56 calculates an adjacency distance L between the points a and b (a distance between the points a and b acquired from the longitude and latitude). In step S67, the third filter processing unit 56 calculates an adjacency converted speed Vm (=L/h1). In addition, at this time, as the adjacency converted speed Vm, although a speed at the time of moving from the point a to the point b is configured to be calculated, a moving speed at the time of moving from the point b to the point c may be configured to be calculated and be used for determination. In step S68, the third filter processing unit 56 determines whether or not the converted speed value Vd is the adjacency converted speed Vm or less. The process of step S68 corresponds to determination of a sudden jump of a positioning result as being an invalid value. In a case in which the converted speed value Vd is not the adjacency converted speed Vm or less, "No" is determined in step S68, and the process proceeds to step S70. On the other hand, in a case in which the converted speed value Vd is the adjacency converted speed Vm or less, "Yes" is determined in step S68, and the process proceeds to step S69.

In step S69, the third filter processing unit 56 deletes the point b from the history data as an abnormal value. In other words, in accordance with the determinations of steps S63 and S68, in the case of "returning to a nearby position" "at a high speed", the point b is deleted from the history data. In step S70, the third filter processing unit 56 determines whether or not the condition for returning to the position specifying process is satisfied. The condition for returning to the position specifying process, for example, in a case in which the history data stored in the history data storage unit 71 is processed as an ex post facto, is being final data of the processing target (being at the end of data in units of activity, corresponding to one day, or the like) and, in a case in which positioning information is processed in real time, when each block of data temporarily stored in a buffer having a predetermined size is processed, being final data of the processing target (being at the end of a block of data stored in the buffer), or the like. In addition, in a case in which the positioning information is processed in real time and in a case in which data is not stored a buffer (the process is performed every time when positioning information is input), in step S70, the condition for returning to the position specifying process is determined to be satisfied. In a case in which the condition for returning to the position specifying process is not satisfied, "No" is determined in step S70, and the positioning information of the processing target is transitioned to the next three points, and the process proceeds to step S61. On the other hand, in a case in which the condition for returning to the position specifying process is satisfied, "Yes" is determined in step S70, and the process is returned to the position specifying process.

Figure 12:
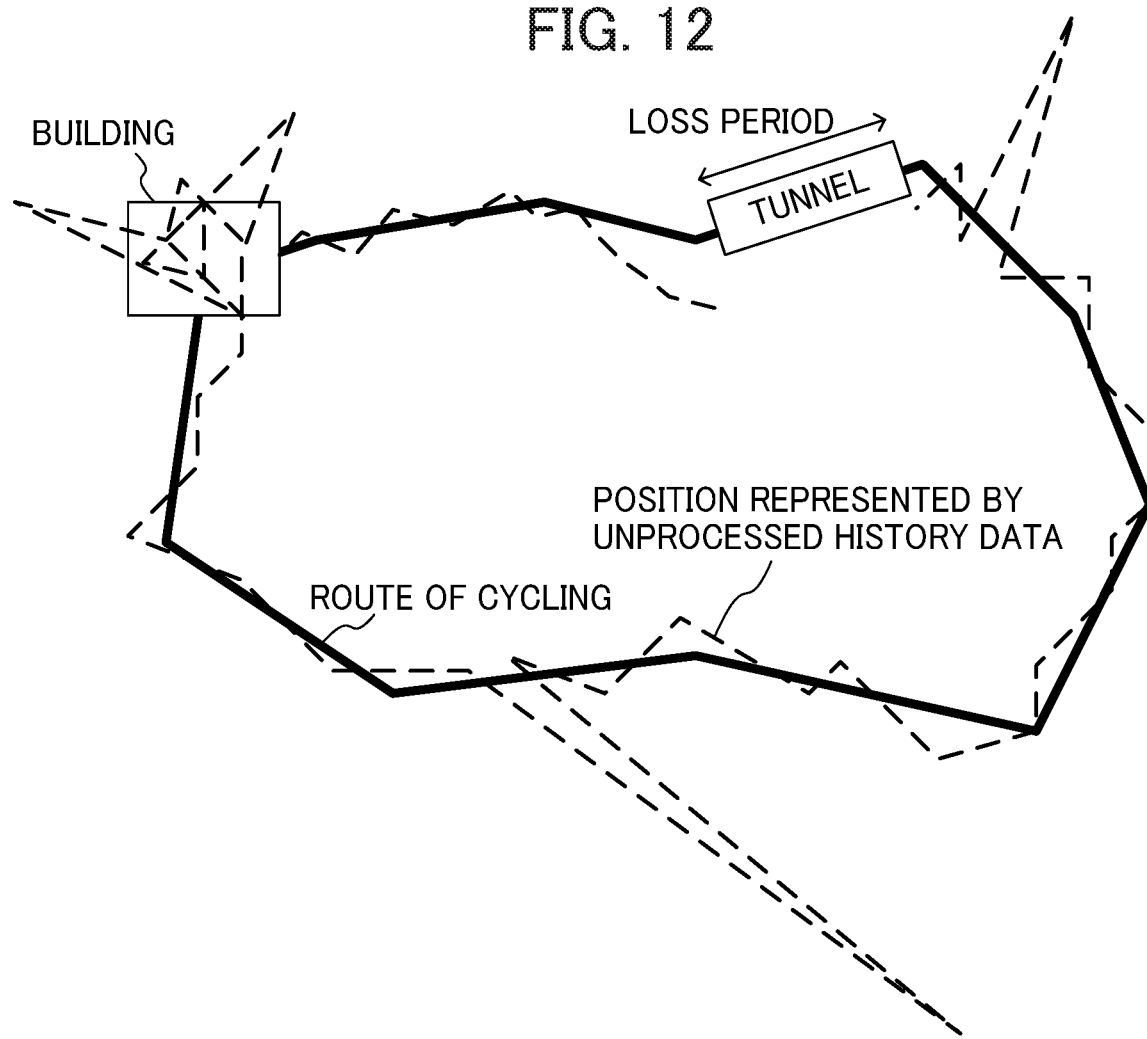
FIG. 12 is a schematic diagram that illustrates an example in which a user's position is displayed using history data (history data that has not been processed) before a filter process using a position specifying process is performed.

By using such a process, an abnormal value in the positioning information of a GPS can be appropriately excluded, and a more correct position can be specified. FIG. 12 is a schematic diagram that illustrates an example in which a user's position is displayed using history data (history data that has not been processed) before a filter process using a position specifying process is performed. In the example illustrated in FIG. 12, history data including errors such as an abnormal value of acceleration, incorrect position information acquired after a loss period, and moving that is not possible as a user's behavior is displayed.

Figure 13:
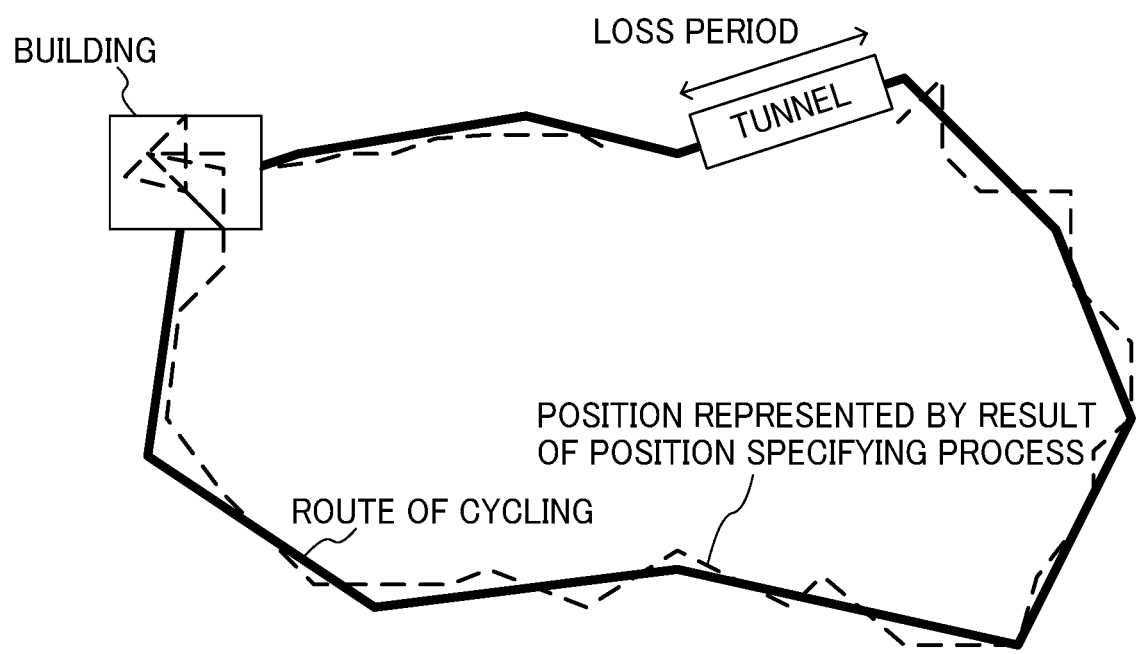
FIG. 13 is a schematic diagram that illustrates an example in which a user's position is displayed using history data after a filter process using a position specifying process is performed.

FIG. 13 is a schematic diagram that illustrates an example in which a user's position is displayed using history data after the filter process using the position specifying process is performed. In the example illustrated in FIG. 13, history data limited to more correct data is displayed which is acquired by appropriately excluding errors such as an abnormal value of acceleration, incorrect position information acquired after a loss period, and moving that is not possible as a user's behavior using the acceleration filter, the loss extension filter, and the positioning context filter. In addition, the process of excluding an abnormal value in the positioning information can be performed by referring to the history data stored in the history data storage unit 71 in a situation in which the supply of power to the wrist terminal 1 is sufficiently performed (during charging or the like) or in a situation in which the processing load is distributed in time, and positioning is not performed.

[Parameter Control Process]

Figure 14:
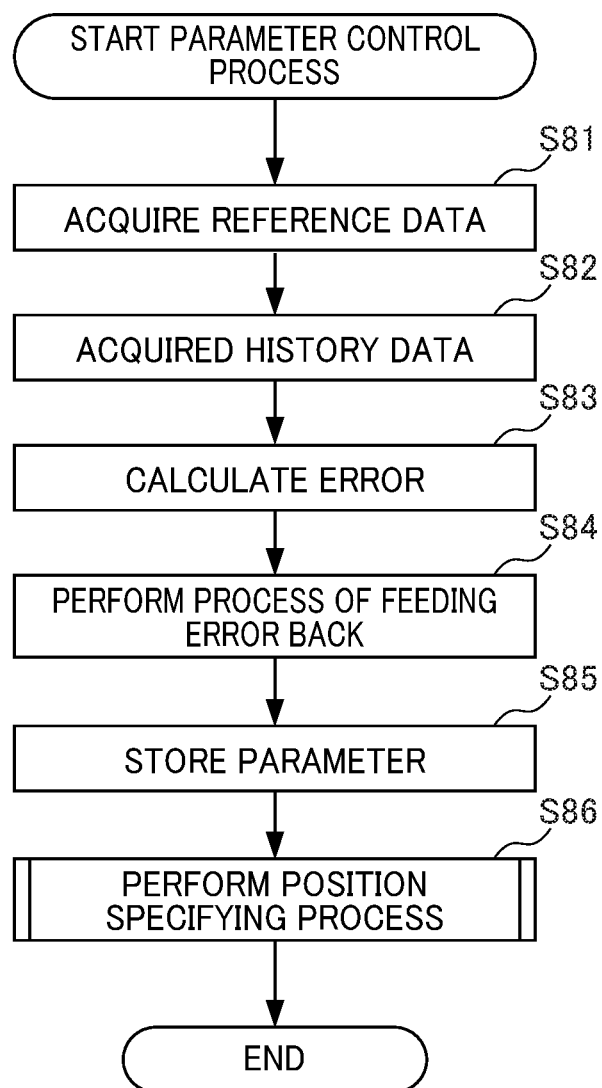
FIG. 14 is a flowchart that describes the flow of a parameter control process performed by the wrist terminal illustrated in FIG. 1B having the functional configuration illustrated in FIG. 2.

Next, a parameter control process will be described. FIG. 14 is a flowchart that describes the flow of the parameter control process performed by the wrist terminal 1 illustrated in FIG. 1B having the functional configuration illustrated in FIG. 2. The parameter control process is started when an operation for directing the start of the parameter control process is performed by a user.

In step S81, the parameter control unit 57 acquires data referred to as a correct answer in the parameter control process. Here, the data referred to as a correct answer, for example, is training data of which the actual position is separately perceived or data of which a position having a constant degree of validity is estimated through map matching (route fitting or the like. In step S82, the parameter control unit 57 acquires history data after the filter process using the position specifying process.

In step S83, the parameter control unit 57 calculates an error between the data referred to as the correct answer and the history data after the filter process. In step S84, the parameter control unit 57 feeds the calculated error back and adjusts parameters of each filter. In step S85, the parameter control unit 57 stores the parameters after the adjustment in the parameter storage unit 72.

In step S86, the parameter control unit 57 performs a position specifying process of unprocessed data stored in the history data storage unit 71 by using the parameters after the adjustment in each filter. After step S86, the parameter control process ends. In this way, by using more appropriate parameters that have been adjusted, the position specifying process can be restarted, and accordingly, a more accurate position can be specified.

MODIFIED EXAMPLE 1

Figure 15:
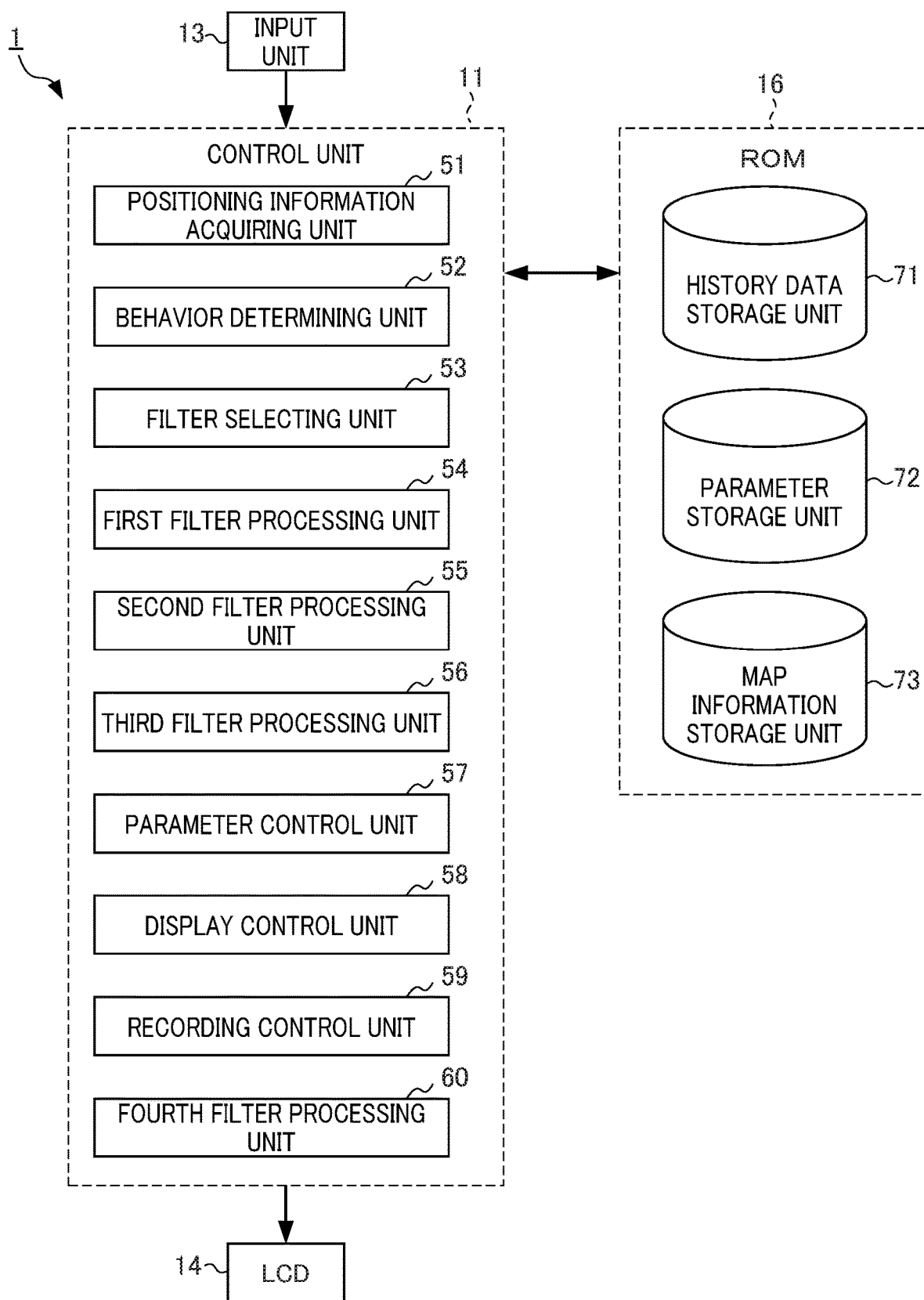
FIG. 15 is a functional block diagram that illustrates the functional configuration of a wrist terminal for performing a submergence detection filter process.

In the embodiment described above, in addition to the acceleration filter process, the loss extension filter process, and the positioning context filter process, a submergence detection filter process detecting the submergence of the wrist terminal 1 may be performed. FIG. 15 is a functional block diagram that illustrates the functional configuration of the wrist terminal 1 for performing the submergence detection filter process.

The submergence detection filter process is a series of processes in which, in a case in which a user's behavior is surfing or paddle, it is detected whether or not the wrist terminal 1 is submerged, and positioning information during submergence is deleted from the history data. In a case in which the submergence detection filter is performed, a fourth filter processing unit 60 functions in addition to the functional configuration illustrated in FIG. 2. The fourth filter processing unit 60 performs a filter process using the submergence detection filter by using parameters selected by the filter selecting unit 53 in a case in which the submergence detection filter is determined to be used by the filter selecting unit 53.

Figure 16:
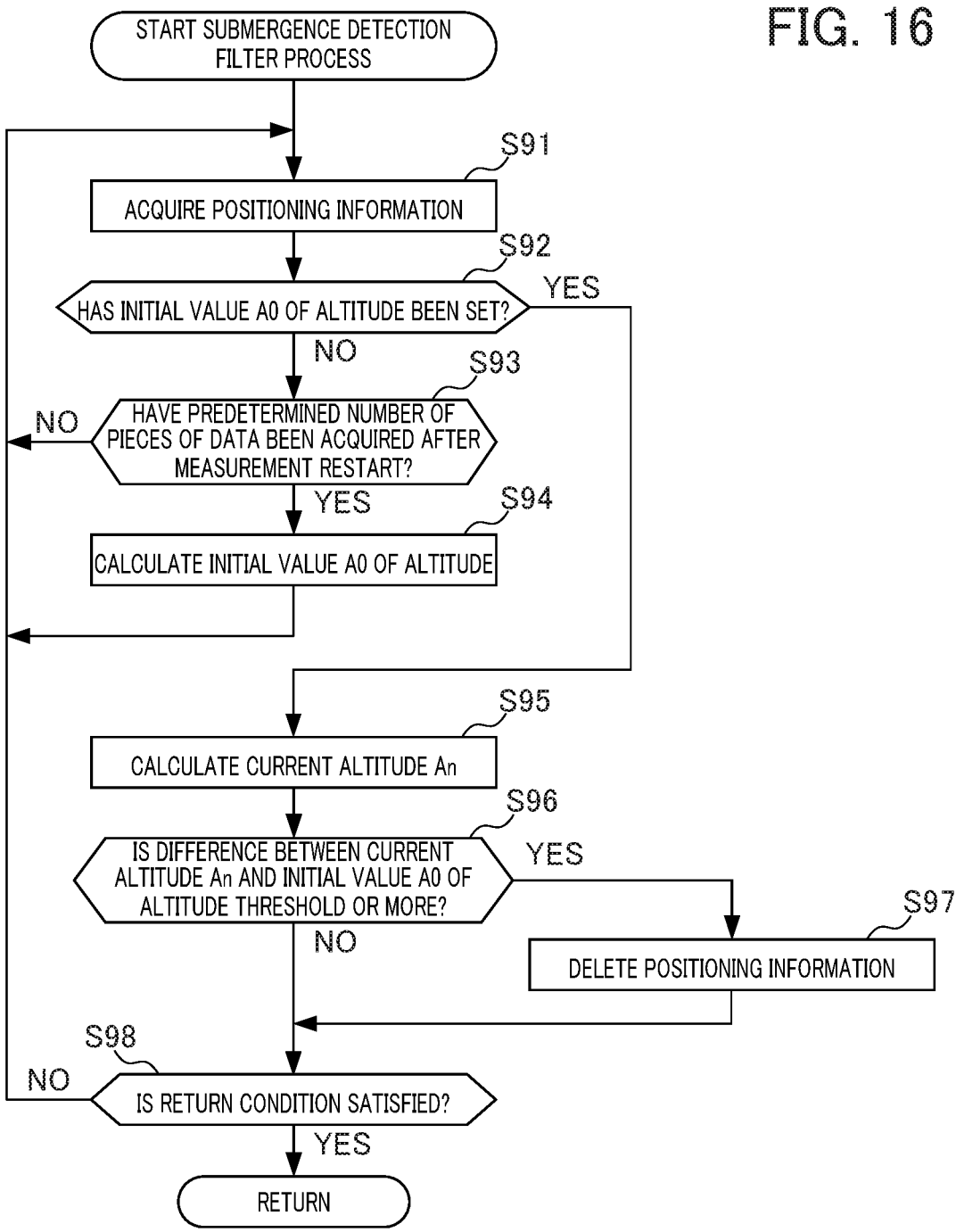
FIG. 16 is a flowchart that describes the flow of a submergence detection filter process.

The submergence detection filter is a filter detecting that the wrist terminal 1 is submerged by using that the altitude represents an abnormal value before and after a loss period in a case in which the wrist terminal 1 is submerged, and positioning information is lost. FIG. 16 is a flowchart that describes the flow of the submergence detection filter process. The submergence detection filter process is performed as a filter process of a final stage in a case in which a user's behavior is determined to be surfing or paddle in a position specifying process. In step S91, the fourth filter processing unit 60 acquires positioning information.

In step S92, the fourth filter processing unit 60 determines whether or not the initial value A0 of the altitude is in a set state. In a case in which the initial value A0 of the altitude is not in the set state, "No" is determined in step S92, and the process proceeds to step S93. On the other hand, in a case in which the initial value A0 of the altitude is in the set state, "Yes" is determined in step S92, and the process proceeds to step S95.

In step S93, the fourth filter processing unit 60 determines whether or not a predetermined number (here, five) of pieces of positioning information have been acquired after the start of the positioning. In a case in which the predetermined number of pieces of positioning information have not been acquired after the start of the positioning, "No" is determined in step S93, and the process proceeds to step S91. On the other hand, in a case in which the predetermined number of pieces of positioning information have been acquired after the start of the positioning, "Yes" is determined in step S93, and the process proceeds to step S94.

In step S94, the fourth filter processing unit 60 sets the initial value A0 of the altitude that is a criterion. In a case in which the standard deviation of the predetermined number of pieces of positioning information is 15 [m] or more, the initial value A0 of the altitude is set as an average value of the altitudes of the predetermined number of pieces of positioning information excluding a maximum value and a minimum value. On the other hand, in a case in which the standard deviation of the predetermined number of pieces of positioning information is less than 15 [m], the initial value A0 of the altitude is set as an average value of the altitudes of the predetermined number of pieces of positioning information. After step S94, the process proceeds to step S91.

In step S95, the fourth filter processing unit 60 calculates an average of altitudes of a predetermined number (here, five) of pieces of positioning information that have been acquired latest as a current altitude An. In step S96, the fourth filter processing unit 60 determines whether or not a difference between the current altitude An and the initial value A0 of the altitude is an altitude difference threshold (for example, 40 [m]) or more. In a case in which the difference between the current altitude An and the initial value A0 of the altitude is the altitude difference threshold or more, "Yes" is determined in step S96, and the process proceeds to step S97. On the other hand, in a case in which the difference between the current altitude An and the initial value A0 of the altitude is not the altitude difference threshold or more, "No" is determined in step S96, and the process proceeds to step S98.

In step S97, since the current altitude An is an abnormal value, the fourth filter processing unit 60 deletes the current positioning information from the history data. In step S98, the fourth filter processing unit 60 determines whether or not a condition for returning to the position specifying process is satisfied. The condition for returning to the position specifying process, for example, in a case in which the history data stored in the history data storage unit 71 is processed as an ex post facto, is being final data of the processing target (being at the end of data units of activity, corresponding to one day, or the like) and, in a case in which positioning information is processed in real time, when each block of data temporarily stored in a buffer having a predetermined size is processed, being final data of the processing target (being at the end of a block of data stored in the buffer), or the like. In addition, in a case in which the positioning information is processed in real time and in a case in which data is not stored in a buffer (the process is performed every time when positioning information is input), in step S98, the condition for returning to the position specifying process is determined to be satisfied. In a case in which the condition for returning to the position specifying process is not satisfied, "No" is determined in step S98, and the process proceeds to step S91. On the other hand, in the case of the final data of the processing target, "Yes" is determined in step S98, and the process is returned to the position specifying process. In this way, a positioning disturbance occurring after the submergence period can be suppressed.

MODIFIED EXAMPLE 2

In the embodiment described above, in a case in which the parameters are updated by the parameter control unit, the position specifying process may be performed again to specify a more appropriate position. For example, in activities performed on one day, history data of a position specified in the position specifying process may be stored as provisional history data. Then, by performing a parameter control process at a timing such as midnight and performing a position specifying process using the updated parameters, the position in the activities of the day can be updated with a more appropriate position. This series of the parameter control process and the position specifying process may be performed by a server that has uploaded the history data from the wrist terminal 1 or the like.

MODIFIED EXAMPLE 3

In the embodiment described above, in a case in which the result of specifying a position is desired to be displayed in real time, riot a result of application of all the filters but one of stages of a result of the process of the acceleration filter, a result of the process of the loss extension filter, and a result of the process of the positioning context filter may be selected and displayed in accordance with a display mode.

MODIFIED EXAMPLE 4

In the embodiment described above, although a case in which the number of pieces of positioning information that are determination targets for the positioning context filter is two has been described as an example, the present invention is not limited thereto. In other words, the number of pieces of positioning information that are determination targets for the positioning context filter may be increased (for example, eight). In a case in which the number of pieces of positioning information that are determination targets for the positioning context filter is two, display can be performed with a semi-real time characteristic (a sequential characteristic suppressed to a short-time delay). Meanwhile, in a case in which the number of pieces of positioning information that are determination targets for the positioning context filter is increased, the filter process can be performed as an ex post facto process with the accuracy prioritized regardless of the real-time characteristic. In a case in which the number of pieces of positioning information that are determination targets for the positioning context filter is increased, for positioning information of interest, a radius of action and a statistical action range (adjacent action circle) are set using a predetermined number of pieces of positioning information before and after the positioning information of interest (for example, respectively four pieces of positioning information before and after the positioning information of interest) in the time series. For example, among the predetermined number of sequential pieces of positioning information in the time series, a longest distance thereof is set as a diameter, and an adjacent action circle having a half distance of this diameter as its radius of action is set. Then, for this adjacent action circle, in a case in which a round trip over the radius of action is performed in a short time (for example, a round trip of a distance over three times the radius of action), it is impossible to perform such moving as a user's behavior, and the moving is estimated as an abnormal value. In addition, a selection ratio between pieces of position information, which are sequential in time, used for setting an adjacent, circle of action may be adjusted in accordance with a display mode of the positioning information. Thus, in a case in which position information sequentially acquired is stored in a buffer, and the position information is displayed in semi-real time, predetermined numbers of pieces of positioning information before and after the positioning information of interest, for example, may be configured to be selected at the ratio of three pieces of positioning information from time points before the positioning information of interest in the time series and one piece of positioning information from a time point after the positioning information of interest. By configuring as such, display of a trajectory having high accuracy can be performed almost in parallel with real-time GPS positioning. In addition, the adjacent action circle may be set using only position information acquired after the positioning information of interest as positioning information that is determination target used for the process of determining the positioning information of interest.

MODIFIED EXAMPLE 5

In the embodiment described above, the setting of the positioning context filter may be adaptively changed in accordance with various conditions. For example, the number of pieces of positioning information that are determination targets for the positioning context filter may be changed in accordance with user's various situations (the type of behavior, positioning environments, and the like) and various requests (a decrease in the amount of calculation and the like). For example, the number of pieces of positioning information that are determination targets for the positioning context filter may be increased or decreased in accordance with user's cycling or daily behavior. In addition, the number of pieces of positioning information that are determination targets for the positioning context filter may be increased or decreased in accordance with the residual amount of the battery or the processing load of the wrist terminal 1. Furthermore, in the embodiment described above, a method of selecting positioning information that is a determination target for the positioning context filter may be changed in accordance with user' various situations (the type of behavior, positioning environments, and the like) and various requests (a decrease in the amount of calculation and the like). Here, the method of selecting positioning information means position information before and after positioning information of interest that is to be selected. For example, as a method of selecting positioning information, a method in which a predetermined number of pieces of positioning information before/after the positioning information of interest are selected, a method in which the number of pieces of positioning information after the positioning information of interest to be selected is more than the number of pieces of positioning information before the positioning information of interest, or, to the contrary, a method in which the number of pieces of positioning information before the positioning information of interest to be selected is more than the number of pieces of positioning information after the positioning information of interest may be used. Also in such a case, for example, the method of selecting positioning information that is a determination target for the positioning context filter may be changed in accordance with user's cycling or daily behavior in addition, the method of selecting positioning information that is a determination target for the positioning context filter may be changed in accordance with the residual amount of the battery or the processing load of the wrist terminal 1.

MODIFIED EXAMPLE 6

In the embodiment described above, although a case in which the present invention is applied to the positioning information of a GPS has been described as an example, the present invention is not limited thereto. In other words, the present invention may be applied also to a case in which position information based on a network location is used together with the positioning information of a GPS. For example, in a case in which a network location of a Wi-Fi router is used or the like, although a situation in which a positioning location is instantly transitioned to a foreign country and is returned may occur, also in such a situation, the effects of the present invention can be acquired.

MODIFIED EXAMPLE 7

In the embodiment described above, map matching (route fitting) may be performed by aggregating positioning information for the activities of many users in a server and setting a substantial route (virtual route) in map information in which a route has not been set. For example, a virtual route is set for a path of a lift in a sky resort, and map matching (route fitting) is performed, whereby the position can be specified with higher accuracy. In addition, by performing a parameter control process using the information of the virtual route, the parameters of the filter can be adjusted.

The wrist terminal 1 configured as above includes the positioning information acquiring unit 51, the behavior determining unit 52, the first filter processing unit 54, the second filter processing unit 55, the third filter processing unit 56, and the display control unit 58. The positioning information acquiring unit 51 acquires the position information of a user. The behavior determining unit 52 specifies the movement state of the user. The first filter processing unit 54, the second filter processing unit 55, and the third filter processing unit 56 are determination devices (filters) according to the movement state and determine the appropriateness/inappropriateness of position information acquired by the positioning information acquiring unit 51. Accordingly, an abnormal value in the position information is appropriately excluded, and a more accurate position can be specified. Accordingly, the determination of appropriateness/inappropriateness of the position information of a user can be performed with higher accuracy.

The wrist terminal 1 includes the filter selecting unit 53. The filter selecting unit 53 selects a corresponding determination device from among determination devices of different types on the basis of a movement state specified by the behavior determining unit 52. The first filter processing unit 54, the second filter processing unit 55, and the third filter processing unit 56 are determination devices selected by the filter selecting unit 53 and determine the appropriateness/inappropriateness of the position information acquired by the positioning information acquiring unit 51. In this way, the appropriateness/inappropriateness of the position information can be determined by using an appropriate determination device according to the movement state.

The behavior determining unit 52 specifies a movement state corresponding to a user's movement state among a plurality of kinds of movement states. In this way, a movement state that is appropriate for a user's current behavior can be specified from among a plurality of kinds of movement states.

The wrist terminal 1 includes the recording control unit 59. The recording control unit 59 outputs a series of pieces of position information of which a part not appropriate for display is specified. Accordingly, a device other than the wrist terminal 1 can use a result of the determination of appropriateness/inappropriateness of the position information of a user.

The first filter processing unit 54, the second filter processing unit 55, and the third filter processing unit 56 determine the appropriateness/inappropriateness of position information on the basis of an index acquired on the basis of the position information of the user and a threshold of the index set in correspondence with the movement state of the user. In this way, the determination of appropriateness/inappropriateness of the position information of the user can be performed with higher accuracy by using a determination criterion corresponding to the movement state of the user.

The first filter processing unit 54 determines the appropriateness/inappropriateness of position information by using a physical quantity acquired on the basis of the position information of the user as an index on the basis of the physical quantity and the threshold of the physical quantity set in correspondence with the movement state of the user. In this way, by referring to the physical quantity acquired on the basis of the position information of the user, the determination of appropriateness/inappropriateness of the position information of the user can be performed with higher accuracy.

The second filter processing unit 55 determines the appropriateness/inappropriateness of the position information by using an acquisition status of the position information of the user as an index on the basis of the acquisition status and the threshold of the acquisition status set in correspondence with the movement state of the user in this way, by referring to the acquisition status of the position information of the user, the determination of appropriateness/inappropriateness of the position information of the user can be performed with higher accuracy.

The third filter processing unit 56 determines the appropriateness/inappropriateness of position information by using a behavior tendency acquired on the basis of the position information of user as an index on the basis of the behavior tendency and the threshold of the behavior tendency set in correspondence with the movement state of the user. In this way, by referring to the behavior tendency acquired on the basis of the position information of the user, the determination of appropriateness/inappropriateness of the position information of the user can be performed with higher accuracy.

The first filter processing unit 54, the second filter processing unit 55, and the third filter processing unit 56 determine appropriateness/inappropriateness of position information by using a physical quantity acquired on the basis of the position information of the user as a first index, using the acquisition status of the position information of the user as a second index, and using a behavior tendency acquired on the basis of the position information of the user as a third index on the basis of the physical quantity, the acquisition status, and the behavior tendency, and the threshold of the physical quantity set in correspondence with the movement state of the user, the threshold of the acquisition status, and the threshold of the behavior tendency. In this way, the physical quantity acquired on the basis of the position information of the user, the acquisition status of the position information of the user, and the behavior tendency acquired on the basis of the position information of the user can be determined integrally, and accordingly, the determination of the appropriateness/inappropriateness of the position information of the user can be performed with higher accuracy.

The first filter processing unit 54, the second filter processing unit 55, and the third filter processing unit 56 acquire a first determination result by determining the appropriateness/inappropriateness of the position information on the basis of the physical quantity that is the first index and the threshold of the physical quantity, acquire a second determination result by determining the appropriateness/inappropriateness of the position information on the basis of the acquisition status that is the second index described above and the threshold of the acquisition status for the first determination result, and acquire a third determination result by determining the appropriateness/inappropriateness of the position information on the basis of the behavior tendency that is the third index described above and the threshold of the behavior tendency for the second determination result in this way, the first to third indexes can be determined in a more appropriate order, and accordingly, the determination of the appropriateness/inappropriateness of the position information of the user can be performed with a higher accuracy.

The present invention is not limited to the embodiment described above, and changes, improvements, and the like in a range in which the object of the present invention can be achieved belong to the present invention. For example, in the embodiment described above, in a case in which positioning information is deleted from the history data using each filter, data erasing, invalidation of data, or the like may be performed. In addition, in the embodiment described above, in the loss extension filter, although a case in which the loss threshold Se is set for each type of activity has been described as an example, this loss threshold Se may be changed in accordance with the position or the time. Furthermore, in the embodiment described above, although the determination device determining the appropriateness/inappropriateness of positioning information is configured by various filter processes performed by the control unit 11 of the wrist terminal 1, the present invention is not limited thereto. In addition, determination devices corresponding to various filters may be configured by hardware, and the wrist terminal 1 may perform the process using output results of the determination devices.

Furthermore, in the embodiment described above, in the loss extension filter process, as the acquisition status of the positioning information, a part (loss part) in which the positioning information is deficient may be referred to from various viewpoints. In other words, instead of referring to a time in which positioning information is not acquired (the length of the loss time) as a loss part, the number of times of not acquiring positioning information or the like may be referred to. In addition, in correspondence with this, in a case in which the positioning information is deleted from the history data, instead of setting a loss extension period (time), setting of the number of times of loss extension or the like may be performed.

In the above-described embodiment, the wrist terminal is given as an example of an electronic device to which the present invention is applied. However, the embodiment is not particularly limited thereto. For example, the present invention is applicable to general electronic devices having the function of measuring exercise. As more specific examples, the present invention is applicable to a notebook-type personal computer, a tablet terminal, a camcorder, a portable navigation device, a cell phone, a smartphone, and a portable gaming device.

In the above-described embodiment, the control unit 11 in the wrist terminal 1 is controls the function shown in the flowchart of FIGS. 8 to 11 and FIG. 14. Alternatively, data may be transmitted to a smartphone and the like via the wireless communication module 21, and the smartphone may perform arithmetic processing and return the result of the arithmetic processing back to the wrist terminal 1, whereby the LCD 14 may display the result. In the above-described embodiment, various types of data are recorded in the RAM 17 inside the wrist terminal 1 or the removable medium 31. Alternatively, data may be transmitted through the wireless communication module 21 to a smartphone and may be recorded into the smartphone, for example. That is, when the function of the wrist terminal 1 is dispersedly implemented to a plurality of electronic apparatuses, the position specifying system can be configured. In this case, with cooperation of each of the electronic apparatuses implemented with various functions, the function corresponding to the wrist terminal 1 performing the position specifying process can be realized.

The processing sequence described above can be executed by hardware, and can also be executed by software. In other words, the functional configuration shown in FIG. 2 is merely an illustrative example, and the present invention is not particularly limited thereto. More specifically, the types of functional blocks employed to realize the above-described functions are not particularly limited to the example shown in FIG. 2, so long as the wrist terminal 1 can be provided with the functions enabling the aforementioned processing sequence to be executed as a whole. A single functional block may be configured by a single piece of hardware, a single installation of software, or any combination thereof. The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific integrated Circuit) or FPGA (Field-Programmable Gate Array).

In the case of having the series of processing executed by software, the program constituting this software is installed from a network or recording medium to a computer or the like. The computer may be a computer embedded in dedicated hardware. In addition, the computer may be a computer capable of executing various functions, e.g., a general purpose personal computer, by installing various programs.

The storage medium containing such a program can not only be constituted by the removable medium 31 shown FIG. 1B distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 1 in which the program is recorded.

It should be noted that, in the present specification, the steps defining the program recorded in the storage medium include not only the processing executed in a time series following this order, but also processing executed in parallel or individually, which is not necessarily executed in a time series.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. An electronic apparatus comprising:
   a processor; and
   a memory storing instructions for a plurality of combinations of filters which combinations correspond to a plurality of movement states, and instructions that, when executed by the processor, cause the processor to:
   acquire position information of a user;
      specify, from among the plurality of movement states, a movement state corresponding to a movement state of the user;
      select, from among the plurality of combinations of filters stored in the memory, a combination of filters which corresponds to the specified movement state; and
   determine appropriateness/inappropriateness of the acquired position information using the selected combination of filters;
   wherein the processor determines the appropriateness/inappropriateness of the position information on the basis of an index acquired based on the position information of the user and a threshold of the index set in correspondence with the movement state of the user; and
   wherein the processor adopts, as the index, an acquisition status of the position information of the user, and determines the appropriateness/inappropriateness of the position information on the basis of the acquisition status and a threshold of the acquisition status set in correspondence with the movement state of the user.

2. The electronic apparatus according to claim 1, wherein the processor outputs the position information that is determined as being appropriate.

3. The electronic apparatus according to claim 2, wherein:
   the processor adopts, as a first index, a physical quantity acquired on the basis of the position information of the user, the processor adopts, as a second index, the acquisition status of the position information of the user, the processor adopts, as a third index, a behavior tendency acquired on the basis of the position information of the user, and the processor determines the appropriateness/inappropriateness of the position information on the basis of the physical quantity, the acquisition status, the behavior tendency, a threshold of the physical quantity, the threshold of the acquisition status, and a threshold of the behavior tendency set in correspondence with the movement state of the user.

4. The electronic apparatus according to claim 1, wherein the processor adopts, as another index, a physical quantity acquired based on the position information of the user, and determines the appropriateness/inappropriateness of the position information on the basis of the physical quantity and a threshold of the physical quantity set in correspondence with the movement state of the user.

5. The electronic apparatus according to claim 4, wherein the processor adopts, as a third index, a behavior tendency acquired on the basis of the position information of the user, and determines the appropriateness/inappropriateness of the position information on the basis of the behavior tendency and a threshold of the behavior tendency set in correspondence with the movement state of the user.

6. The electronic apparatus according to claim 5, wherein the processor determines the appropriateness/inappropriateness of the position information on the basis of the physical quantity, the acquisition status, the behavior tendency, the threshold of the physical quantity, the threshold of the acquisition status, and the threshold of the behavior tendency set in correspondence with the movement state of the user.

7. The electronic apparatus according to claim 5, wherein:

the processor acquires a first determination result by determining appropriateness/inappropriateness of the position information on the basis of the physical quantity that is a first index and the threshold of the physical quantity, the processor acquires a second determination result by determining appropriateness/inappropriateness of the position information on the basis of the acquisition status that is a second index and the threshold of the acquisition status with respect to the first determination result, and the processor acquires a third determination result by determining appropriateness/inappropriateness of the position information on the basis of the behavior tendency that is the third index and the threshold of the behavior tendency with respect to the second determination result.

8. The electronic apparatus according to claim 1, wherein the processor adopts, as another index, a behavior tendency acquired on the basis of the position information of the user, and determines the appropriateness/inappropriateness of the position information on the basis of the behavior tendency and a threshold of the behavior tendency set in correspondence with the movement state of the user.

9. The electronic apparatus according to claim 1, wherein the filters included in the plurality of combinations of filters include an acceleration filter, a loss extension filter, and a positioning context filter.

10. A position specifying system comprising:

a first electronic apparatus that includes a first processor and a first memory storing instructions that are executable by the first processor; and a second electronic apparatus that includes a second processor and a second memory storing instructions that are executable by the second processor, wherein at least one of the first memory and the second memory further stores instructions for a plurality of combinations of filters which combinations correspond to a plurality of movement states, wherein in at least one of the first electronic apparatus and the second electronic apparatus, the instructions stored in the corresponding at least one of the first memory and the second memory, when executed by the corresponding at least one of the first processor and the second processor, cause the corresponding at least one of the first processor and the second processor to:

acquire position information of a user;

specify, from among the plurality of movement states, a movement state corresponding to a movement state of the user;

select, from among the plurality of combinations of filters stored in the memory, a combination of filters which corresponds to the specified movement state; and determine appropriateness/inappropriateness of the acquired position information using the selected combination of filters;

wherein the appropriateness/inappropriateness of the position information is determined on the basis of an index acquired based on the position information of the user and a threshold of the index set in correspondence with the movement state of the user; and wherein the index includes an acquisition status of the position information of the user, and the appropriateness/inappropriateness of the position information is determined on the basis of the acquisition status and a threshold of the acquisition status set in correspondence with the movement state of the user.

11. A position specifying method executed by an electronic apparatus including a processor and a memory storing instructions for a plurality of combinations of filters which combinations correspond to a plurality of movement states, the position specifying method comprising, with the processor:

acquiring position information of a user;

specifying, from among the plurality of movement states, a movement state of the user;

selecting, from among the plurality of combinations of filters stored in the memory, a combination of filters which corresponds to the specified movement state; and determining appropriateness/inappropriateness of the acquired position information using the selected combination of filters;

wherein the appropriateness/inappropriateness of the position information is determined on the basis of an index acquired based on the position information of the user and a threshold of the index set in correspondence with the movement state of the user; and wherein the index includes an acquisition status of the position information of the user, and the appropriateness/inappropriateness of the position information is determined on the basis of the acquisition status and a threshold of the acquisition status set in correspondence with the movement state of the user.

12. A non-transitory computer-readable storage medium storing a program that is executable by a computer that comprises a processor, the program being executable by the computer to cause the computer to perform operations comprising:

acquiring position information of a user;

specifying, from among a plurality of movement states, a movement state corresponding to a movement state of the user;

selecting, from among a plurality of combinations of filters stored in advance and which combinations correspond to the plurality of movement states, a combination of filters which corresponds to the specified movement state; and determining appropriateness/inappropriateness of the acquired position information using the selected combination of filters;

wherein the appropriateness/inappropriateness of the position information is determined on the basis of an index acquired based on the position information of the user and a threshold of the index set in correspondence with the movement state of the user; and wherein the index includes an acquisition status of the position information of the user, and the appropriateness/inappropriateness of the position information is determined on the basis of the acquisition status and a threshold of the acquisition status set in correspondence with the movement state of the user.

* * * * *